United States Patent
Wykman et al.

(10) Patent No.: US 10,869,432 B2
(45) Date of Patent: Dec. 22, 2020

(54) LAWN MONITORING AND MAINTENANCE VIA A ROBOTIC VEHICLE

(71) Applicant: HUSQVARNA AB, Huskvarna (SE)

(72) Inventors: Tomas Wykman, Jönköping (SE); Fredrik Edholm, Jönköping (SE); Eric Lennings, Huskvarna (SE); Pär Christensson, Värnamo (SE); Stefan Grufman, Bankeryd (SE); Björn Mannefred, Huskvarna (SE); Patrik Jägenstedt, Tenhult (SE); Magnus Öhrlund, Malmbäck (SE); Olle Markusson, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 154 days.

(21) Appl. No.: 15/539,317

(22) PCT Filed: Nov. 4, 2015

(86) PCT No.: PCT/IB2015/058534
§ 371 (c)(1),
(2) Date: Jun. 23, 2017

(87) PCT Pub. No.: WO2016/103071
PCT Pub. Date: Jun. 30, 2016

(65) Prior Publication Data
US 2018/0213731 A1 Aug. 2, 2018

Related U.S. Application Data

(60) Provisional application No. 62/095,855, filed on Dec. 23, 2014.

(51) Int. Cl.
*A01G 20/30* (2018.01)
*A01C 21/00* (2006.01)
(Continued)

(52) U.S. Cl.
CPC ............ *A01G 20/30* (2018.02); *A01C 21/007* (2013.01); *A01D 34/008* (2013.01);
(Continued)

(58) Field of Classification Search
CPC ........ A01G 20/30; A01G 18/69; A01C 23/04; A01C 21/007; H04W 84/18; H04W 4/021;
(Continued)

(56) References Cited

U.S. PATENT DOCUMENTS 8,285,460 B2 * 10/2012 Hoffman ................ A01G 25/16
239/1
9,848,532 B2 * 12/2017 Keski-Luopa ......... A01D 43/14
(Continued)

FOREIGN PATENT DOCUMENTS

WO 2014007694 A1 1/2014

OTHER PUBLICATIONS

International Search Report and Written Opinion for International Application No. PCT/IB2015/058534 dated Mar. 14, 2016.
(Continued)

*Primary Examiner* — Hunter B Lonsberry
*Assistant Examiner* — Mathew Franklin Gordon
(74) *Attorney, Agent, or Firm* — Burr & Forman, LLP

(57) ABSTRACT

Some example embodiments may provide a capability for intelligent control or management of a number of assets in connection with yard maintenance with the assistance or inclusion of a management unit having distributed properties. Thus, for example, sensor equipment and task performance equipment operation may be coordinated between local management and remote management entities for efficient monitoring and maintaining of lawn wellness.

21 Claims, 14 Drawing Sheets

(51) Int. Cl.
*A01D 34/00* (2006.01)
*G05D 1/02* (2020.01)
*H04L 29/08* (2006.01)
*H04W 4/021* (2018.01)
*A01D 101/00* (2006.01)
*H04W 84/18* (2009.01)

(52) U.S. Cl.
CPC ......... *G05D 1/0261* (2013.01); *G05D 1/0274* (2013.01); *G05D 1/0278* (2013.01); *H04L 67/125* (2013.01); *H04W 4/021* (2013.01); *A01D 2101/00* (2013.01); *G05D 1/027* (2013.01); *G05D 2201/0208* (2013.01); *H04W 84/18* (2013.01)

(58) Field of Classification Search
CPC ........... G05D 2201/0208; G05D 1/027; G05D 1/0278; G05D 1/0274; G05D 1/0261; A01D 2101/00; A01D 34/008; H04L 67/125
See application file for complete search history.

(56) References Cited

U.S. PATENT DOCUMENTS

| | | | |
|---|---|---|---|
| 9,883,114 B2* | 1/2018 | Einecke | H04N 5/23229 |
| 2011/0035059 A1 | 2/2011 | Ersavas | |
| 2014/0325949 A1 | 11/2014 | Shida et al. | |
| 2014/0358486 A1* | 12/2014 | Osborne | A01G 7/00 |
| | | | 702/189 |
| 2015/0142250 A1* | 5/2015 | Cavender-Bares | A01C 7/00 |
| | | | 701/23 |
| 2016/0157414 A1* | 6/2016 | Ackerman | A01B 69/008 |
| | | | 701/25 |

OTHER PUBLICATIONS

International Preliminary Report on Patentability for International Application No. PCT/IB2015/058534 dated Jun. 27, 2017.

* cited by examiner

LAWN MONITORING AND MAINTENANCE VIA A ROBOTIC VEHICLE

CROSS REFERENCE TO RELATED APPLICATIONS

The present application claims priority to U.S. patent application No. 62/095,855 filed Dec. 23, 2014, which is expressly incorporated by reference in its entirety.

TECHNICAL FIELD

Example embodiments generally relate to robotic vehicles and, more particularly, relate to a robotic vehicle that is configurable to monitor and maintain lawn conditions.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

As technological capabilities have improved, various devices or sensors have been developed that are capable of employment to monitor various aspects of working conditions. However, there is currently no comprehensive way to ensure that the robotic vehicle only services the specific areas of a lawn that are actually desired for servicing. Given that computing devices are becoming more ubiquitous, it is to be expected that they may be employed to assist in operation of lawn mowers. As such, many additional functionalities may be provided or supported by the employment of computing devices on lawn mowers. Thus, it may be desirable to expand the capabilities of robotic vehicles to improve their utility and functionality.

BRIEF SUMMARY OF SOME EXAMPLES

Some example embodiments may therefore provide a capability for intelligent control or management of a number of assets in connection with yard maintenance with the assistance or inclusion of a management unit having distributed properties. Thus, for example, sensor equipment and task performance equipment operation may be coordinated between local management and remote management entities for efficient monitoring and maintaining of lawn wellness.

In an example embodiment, a robotic vehicle for lawn monitoring is provided. The robotic vehicle may include one or more functional components configured to execute a lawn care function, a sensor network comprising one or more sensors configured to detect conditions proximate to the robotic vehicle, and a vegetation analyzer module configured to analyze data received from the sensor network to determine lawn wellness information.

In another example embodiment, a system for yard monitoring is provided. The system may include a sensor network including one or more sensors disposed on a parcel of land, task performance equipment, an application manager and a robotic vehicle. The task performance equipment may be configured to perform a task on the parcel. The task may be associated with generating a result that is enabled to be monitored via the sensor network. The application manager may be configured to interface with the sensor network and the task performance equipment to compare measured conditions with desirable conditions to direct operation of the task performance equipment. The robotic vehicle may be configured to work the parcel. The robotic vehicle may include one or more functional components configured to execute a lawn care function, a sensor network comprising one or more sensors configured to detect conditions proximate to the robotic vehicle, and a vegetation analyzer module configured to analyze data received from the sensor network to determine lawn wellness information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 12:
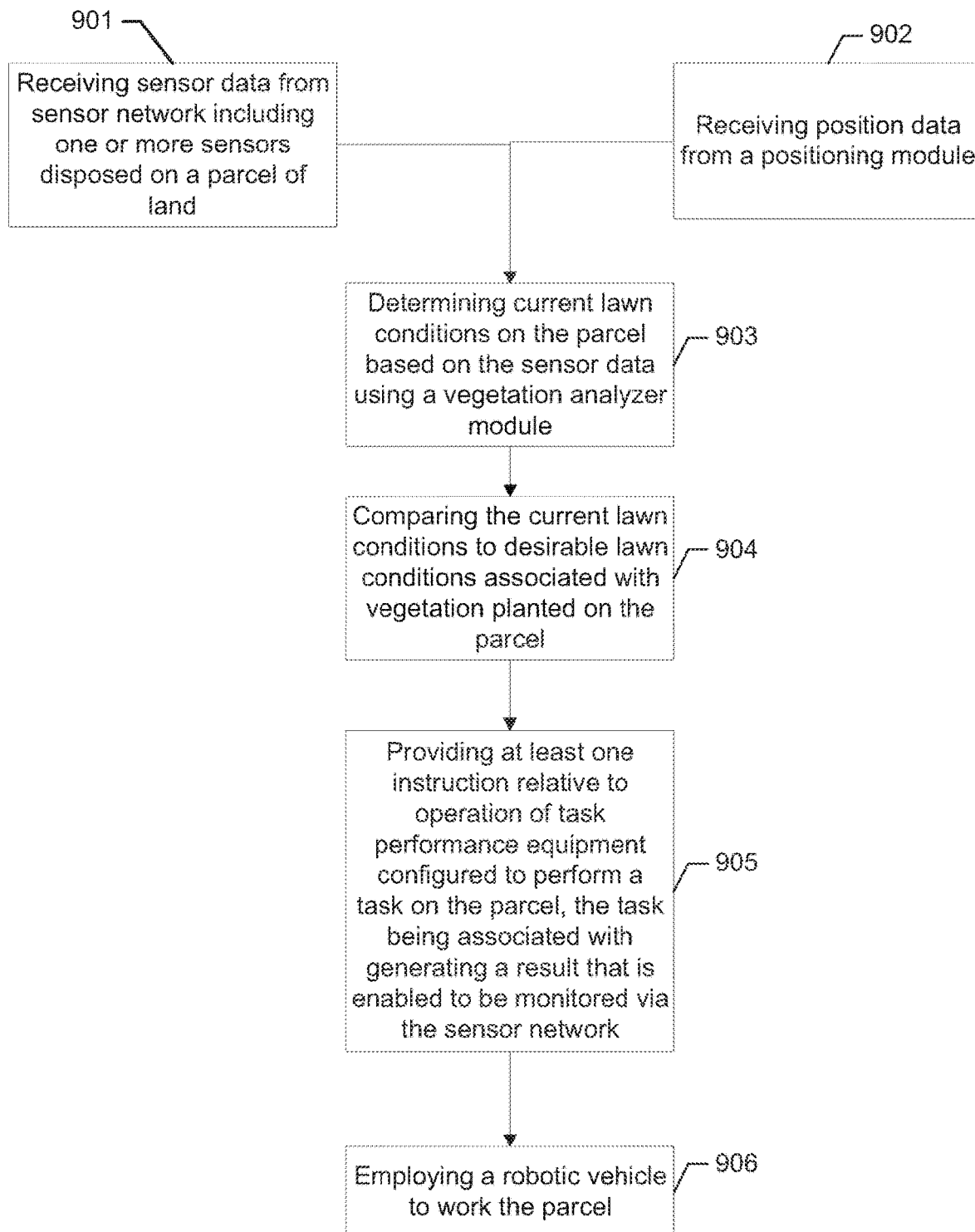
Figure 13:
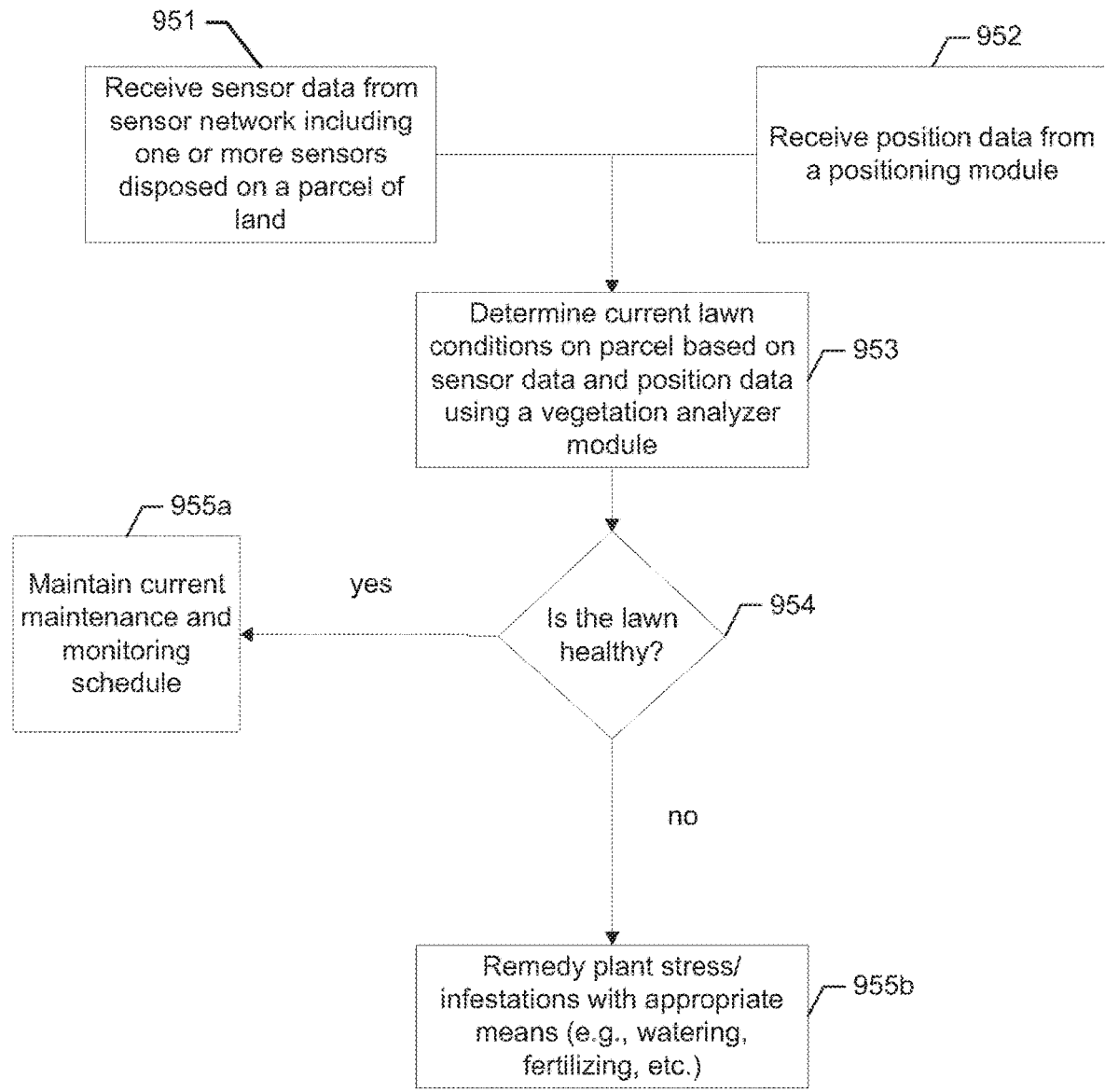
Figure 14:
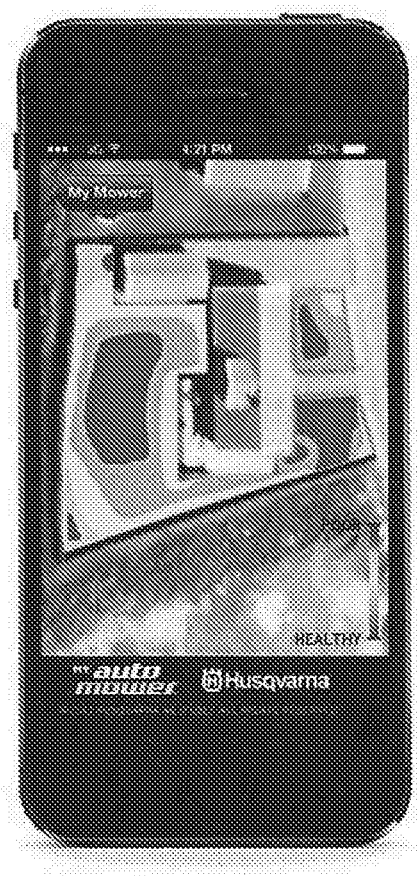

FIG. 12 illustrates a block diagram of a method according to an example embodiment FIG. 13 illustrates a control flow diagram of one example of how a robotic mower can be operated in relation to using the sensors thereon to monitor and maintain lawn wellness according to an example embodiment; and FIG. 14 illustrates a diagram of a mobile application for a robotic mower according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

Example embodiments may provide a comprehensive system for monitoring lawn conditions at any of what may potentially be a number of locations throughout a particular parcel, and performing tasks relative to those locations under the direction of a distributed application manager. In some cases, the tasks and/or monitoring may be accomplished with the assistance of a mobile asset such as a robotic vehicle. In this regard, for example, the system may utilize a communication network that gathers information on growing conditions and lawn wellness from sensor equipment for association of the information with the areas from which the information was gathered. The system may also employ processing circuitry to associate a set of optimal or desirable growing condition and lawn wellness parameters with the various areas. When the information is received describing growing conditions and lawn wellness of the various areas, the processing circuitry may compare the growing conditions and lawn wellness (i.e., current conditions) to the growing condition and lawn wellness parameters (i.e., desired conditions) to determine whether and to what extent corrective actions may be needed to improve growing conditions and lawn wellness. The processing circuitry may receive the information from and/or communicate instructions to, a robotic vehicle. The robotic vehicle may provide a very high degree of flexibility and capability into the system with respect to mechanisms by which power, communication, and task related services may be provided within the system. As mentioned above, the processing circuitry may be distributed between local and remote management components so that some aspects of lawn maintenance may utilize remote assets or at least incorporate information available from abroad, while other aspects can be managed locally.

The system may therefore employ any combination of fixed and/or mobile sensors that gather data that relates to specific segments of the parcel that may correspond to each respective one of the various areas mentioned above. The specific segments may have different lawn conditions therein, and therefore may optimally have different growing conditions desirable in connection with each respective one of the segments. The owner/operator may define the specific segments, which may be referred to as "zones," and identify the lawn conditions associated with each zone or the growing conditions desired for each zone. In some cases, the processing circuitry may be equipped to correlate desirable growing conditions to an identified plant species based on stored information associated with each plant species from a database or online resource. Accordingly, each zone will have corresponding growing condition and lawn wellness parameters associated therewith, and the growing condition and lawn wellness parameters may define the desired growing conditions (e.g., any or all of moisture level, temperature, lighting level, pH, and/or the like) for the corresponding zone. In some cases, the zones may further be associated with the corresponding task performance equipment that may be employed to alter the growing conditions in the respective zones and therefore act as potential resources for performing tasks. The resources may be associated with the zones in such a way as to define the specific resources (e.g., a resource list) that is available for use in any given zone. The processing circuitry may then either direct operation of assets from the resource list to achieve a desired outcome or may provide instructions or suggestions to the owner/operator regarding the assets from the resource list that could be employed to achieve a desired outcome. Alternatively, the processing circuitry may merely inform the owner/operator of the situation, and the owner/operator may be relied upon to take corrective actions as needed.

Figure 1:
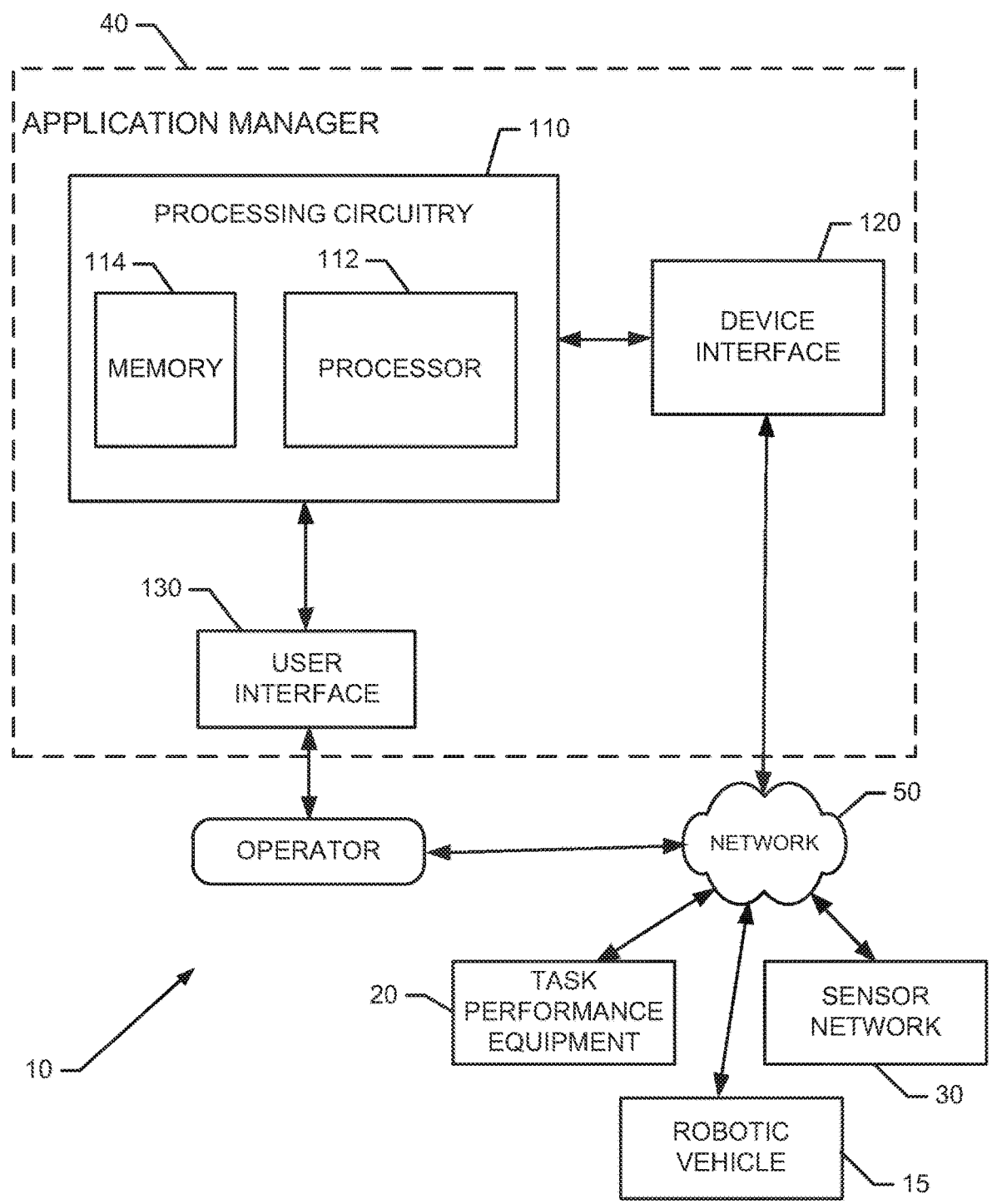
FIG. 1 illustrates a block diagram of a system in accordance with an example embodiment.

FIG. 1 illustrates a block diagram of a system 10 that may be employed to accomplish the basic operations described above in accordance with an example embodiment. Within the context of FIG. 1, it should be appreciated that certain tasks, like grass cutting, are typically performed by lawn mowers, which could be walk behind, ride on, or robotic models. Tasks such as soil preparation may be performed by tillers. Still other tasks, like lawn watering, may be performed by sprinkler heads at fixed locations or by the transportation of water via hoses to desired locations. The transportation could be accomplished manually, or via a robotic vehicle 15. Robotic vehicles or other devices could also be engaged to perform certain other lawn maintenance tasks such as raking, fertilizing, lighting, wildlife dispersion and/or the like. Thus, it should be apparent that sprinklers, robotic vehicles, tillers, mowers and the like represent task performance equipment 20 that may be used to accomplish functional tasks relative to lawn maintenance activities. The task performance equipment 20 may therefore serve as the assets or resources that may be used to achieve desired outcomes within the context of the system.

Meanwhile, various sensors may be employed by the transportation of such sensors using the robotic vehicle. Other sensors could be placed nearby vegetation to monitor certain growing conditions either on a fixed or mobile platform. Thus, for example, sensors could be placed on the task performance equipment 20 in some cases. Regardless of the specific configuration or placement paradigm, the various sensors may represent the sensor network 30, as described above.

The sensor network 30, and in some cases also one or more of the devices that comprise the task performance equipment 20, may be in communication with an application manager 40 via a network 50. The network 50 may be a data network, such as a local area network (LAN), a metropolitan area network (MAN), a wide area network (WAN) (e.g., the Internet), a wireless personal area network (WPAN), and/or the like, which may couple client devices (e.g., the sensor network 30 and/or the task performance equipment 20) to devices such as processing elements (e.g., personal computers, server computers or the like) and/or databases such as the application manager 40. Communication between the network 50, the client devices, and the devices or databases (e.g., servers) to which the client devices are coupled may be accomplished by either wireline or wireless communication mechanisms and corresponding communication protocols. As such, for example, some or all of the sensors of the sensor network 30 may be connected to the application manager 40 by wire and/or wireless communication means. Meanwhile, some or all of the devices of the task performance equipment 20 may be connected to the application manager 40 by wire or by wireless communication means. As such, for example, a remote terminal may be connected to the application manager 40 by wire and/or wireless communication means.

It should also be appreciated that although the robotic vehicle 15 is illustrated separately in FIG. 1, the robotic vehicle 15 may act as one or both of a piece of the sensor network 30 or a piece of task performance equipment 20. However, given the ability of the robotic vehicle 15 to act as either or both of a piece of the sensor network 30 or a piece of task performance equipment 20 and the ability of the robotic vehicle 15 to facilitate operation of the sensor network 30 and/or the task performance equipment 20 even when the robotic vehicle 15 does not necessarily act as one or the other of such devices, the robotic vehicle 15 is shown separately in FIG. 1. It should also be appreciated that the application manager 40 could reside on the robotic vehicle 15, at the charging station of the robotic vehicle 15, or could be instantiated remotely from the robotic vehicle 15 (e.g., instantiated at an electronic device such as a computer, server, or smart phone). Where the application manager 40 resides at the robotic vehicle 15, the processing circuitry of the robotic vehicle and the processing circuitry of the application manager 40 could be the same, or both could be embodied on coprocessors of the same platform.

As shown in FIG. 1, the application manager 40 may include processing circuitry 110 that may be configured to perform data processing, control function execution and/or other processing and management services according to an example embodiment of the present invention. As such, it may be appreciated that the application manager 40 could be embodied as a computer, smart phone, server, or other computing device. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. In some embodiments, the processing circuitry 110 may communicate with electronic components of the sensor network 30 and the task performance equipment 20 via the network 50 (which may include one or more communication networks). The network 50 may be localized such that it is associated with a single parcel, or may extend over and include a plurality of parcels.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons or a keyboard), and/or other input/output mechanisms (e.g., microphone, speakers, cursor, joystick, lights and/or the like). The user interface 130 may be configured to provide alerts, warnings and/or notifications to the user or operator responsive to various trigger conditions being detected (e.g., via the sensor network 30 or other components). In some cases, the user interface 130 may be configured to generate such alerts, warnings and/or notifications in response to plant growing conditions being out of specification or out of recommended ranges. System malfunctions, damage or tampering with equipment, equipment theft and other component related stimuli may also be defined as triggers for generation of the alerts, warnings and/or notifications. The alerts, warnings and/or notifications may be generated via light, sound, visual display, or other devices that may be connected to or part of the application manager 40. In some cases, the notifications may be provided by text message, email, or mobile application.

The device interface 120 may include one or more interface mechanisms for enabling communication with other devices via the network 50. In some cases, the device interface 120 may be any means such as a device or circuitry embodied in either hardware, or a combination of hardware and software that is configured to receive and/or transmit data from/to sensors of the sensor network 30 and devices of the task performance equipment 20 in communication with the processing circuitry 110 by virtue of the device interface 120 being capable of sending and receiving messages via the network 50. In some example embodiments, the device interface 120 may provide interfaces for communication of components internal to the system 10 with components external to the system 10. For example, in an embodiment in which the application manager 40 is embodied as a computer or a server, the device interface 120 may enable communication (e.g., via the internet or wireless communication methods) with a smart phone of the owner/operator. This communication may also occur via the network 50 (or via a sub-network of the network 50) in some cases. However, it should also be appreciated that the owner/operator may directly interact with the application manager 40 via the user interface 130.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the application manager 40. As such, in some embodiments, the processor 112 (or the processing circuitry 110) may be said to cause each of the operations described in connection with the application manager 40 by directing the application manager 40 to undertake the corresponding functionalities responsive to execution of instructions or algorithms configuring the processor 112 (or processing circuitry 110) accordingly. As an example, the application manager 40 may be configured to receive sensor information from the sensor network 30 and make decisions regarding information to be provided to the owner/operator and/or instructions to be provided to task performance equipment 20. The processing circuitry 110 may, in some cases, process the lawn condition information received from the sensor network 30 and compare the lawn condition information to growing condition and lawn wellness parameters that are stored in the memory 114 for a given zone.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the application manager 40 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from the sensor network. Among the contents of the memory 114, applications may be stored for execution by the processor 112 in order to carry out the functionality associated with each respective application. In some cases, the applications may include a comparison of information indicative of current growing conditions detected in a zone to stored information about growing condition and lawn wellness parameters that are desired for the vegetation that is in the zone. As indicated above, the growing condition and lawn wellness parameters may be entered by the operator or may be extracted or retrieved from databases or sources accessible via the Internet based on entry of an identity of the plant vegetation in a given zone.

Figure 2:
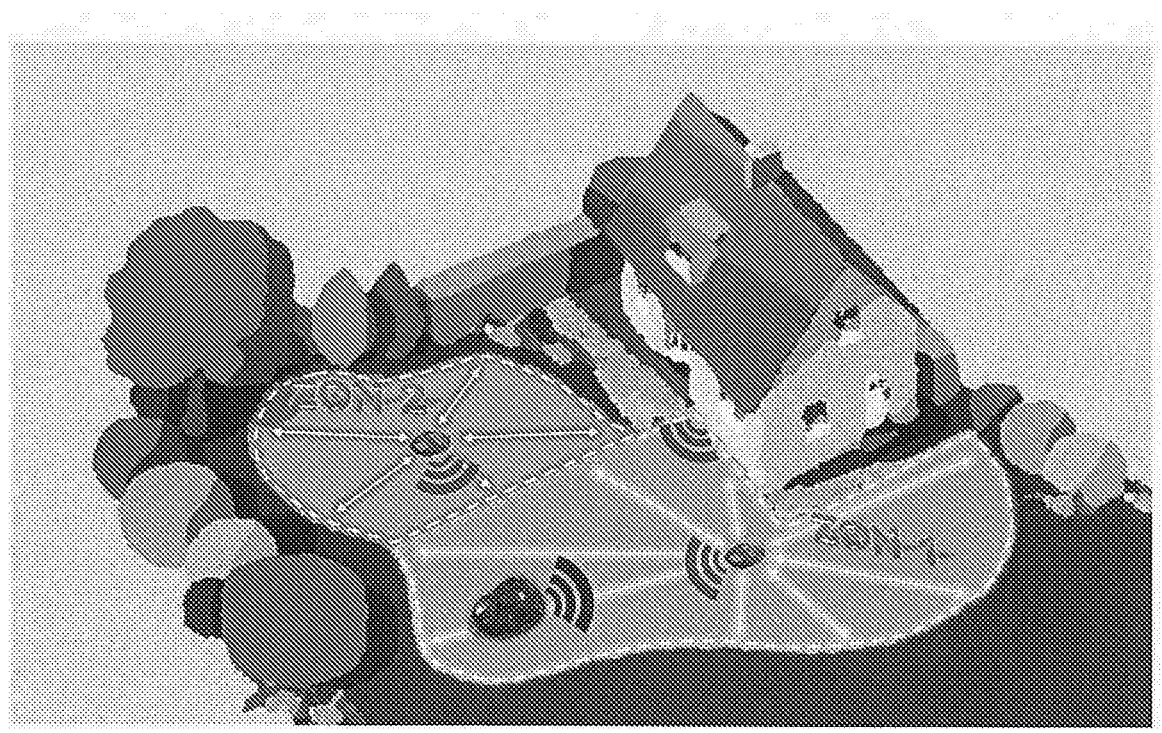
FIG. 2 illustrates a diagram of an example operating environment divided into various zones according to an example embodiment.

As mentioned above, the parcel (or parcels) for which the application manager 40 provides service may be divided into zones. Each zone could be monitored and managed based on the specific different growing conditions that are desirable for the vegetation provided therein. FIG. 2 illustrates a diagram of an example operating environment divided into various zones according to an example embodiment. For example, FIG. 2 illustrates two zones (Zone 1 and Zone 2), but it should be appreciated that many more could be defined. The robotic mower 15 may be enabled to determine its position relative to being within Zone 1 or Zone 2. If desired, the robotic mower 15 may further be enabled to keep within Zone 1 or Zone 2 in accordance with scheduling or other programming instructions provided to the robotic mower. When provided with a schedule, the robotic mower 15 may operate in whichever zone it is scheduled to be in at a given time.

Figure 3:
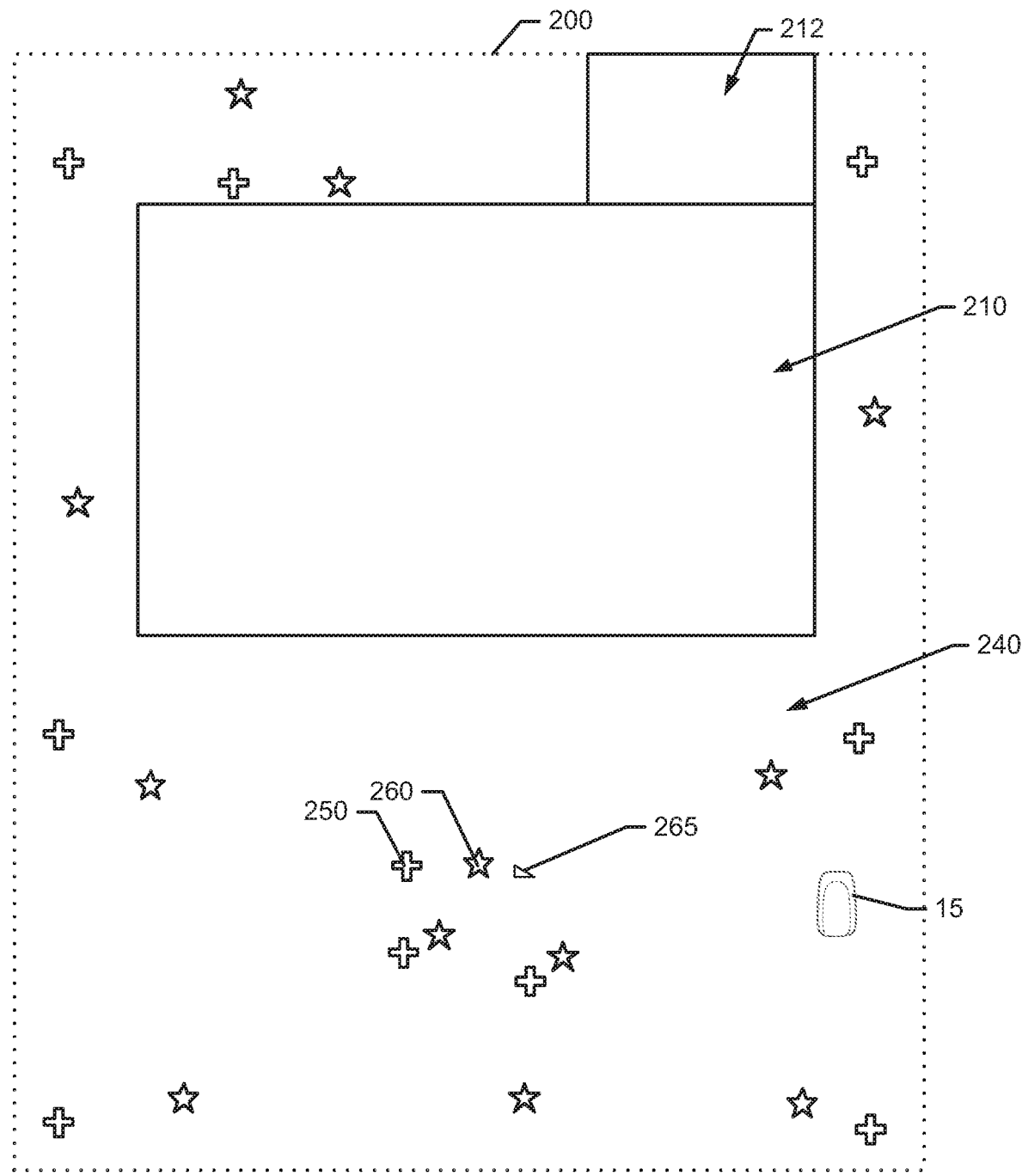
FIG. 3 illustrates a diagram of a parcel that is divided into various zones according to an example embodiment.

FIG. 3 illustrates a diagram of a parcel 200 that is divided into various zones. Some of the zones may be active zones while other zones may be inactive zones. Active zones may be zones that include or otherwise permit access to the sensor network 30 and/or the task performance equipment 20. The inactive zones may be zones that either do not include or do not permit access to the sensor network 30 and/or the task performance equipment 20, or areas for which, regardless of the capability for monitoring and task performance, such activities are not desired. As such, for example, an inactive zone may include an area that is covered by a house, concrete, pavement, or land that is fallow or simply not desired for active management. In FIG. 3, a first inactive zone 210 is defined to outline the footprint of a house, and a second inactive zone 212 is defined to outline the footprint of a driveway leading to the house. Meanwhile, the active zone 240 represents the entire lawn. However, these segmentation examples are merely exemplary in order to present a relatively simple example to facilitate explanation of an example embodiment. Thus, it should be appreciated that the lawn could further be broken up into one or more other (e.g., smaller) zones, if desired.

The zones (if used) may be programmed into the application manager 40 and the application manager 40 may also be aware of the sensor network 30 and task performance equipment 20 that are associated with each respective zone. In some cases, the zones may simply be identified and a corresponding association with assets (e.g., sensors and task performance equipment 20) may also be programmed to correlate each asset to one of the zones (or multiple ones of the zones) without any need for association of the zones with any map data. However, in some embodiments, the parcel 200 may be defined in terms of corresponding map data and the zones may be defined with respect to the map data. In such an example, a display similar to that illustrated in FIG. 3 may be provided to represent the parcel 200. In examples where map data is not desired or otherwise used, the image of FIG. 3 may merely represent the physical layout of the assets, but the application manager 40 need not necessarily have an appreciation for the actual geographical layout. Instead, the application manager 40 may be configured to just maintain data associations between information received, the zones to which the data correlates, and the assets in the zones. As mentioned above, the application manager 40 may also have the ability to record information programmed regarding desirable growing conditions where such information is either programmed directly by the operator or is accessed based on an identification of the plant life that resides within the corresponding zone.

In some embodiments, for example, the memory 114 may store a parcel descriptor file including map data defining boundaries of the parcel 200, boundaries of the zones and/or location information identifying the location of assets (e.g., sensor network 30 and task performance equipment 20) located on the parcel 200. In some cases, the locations and/or boundaries may be identified based on GPS coordinates, triangulation using distance/direction from another known locations or positions and/or the like. Image data may be used to confirm or assist in finding boundaries in some situations. Alternatively or additionally, boundary and/or location information may be learned (e.g., by the robotic vehicle 15 driving proximate to the boundary or location and noting the same (e.g., using RFID technology or the like)). When a boundary or device location is encountered, the map data of the parcel descriptor file may be accessed (via the processing circuitry 110) to record the corresponding information in association therewith. As such, in some embodiments, the boundary wire defining the work area of the robotic vehicle 15 may correspond to the boundary of one or more of the zones.

As mentioned above, the robotic vehicle 15 may enhance the capabilities of the system 10, or the robotic vehicle 15 may serve as one or more of the other components (e.g., the sensor network 30 or the task performance equipment 20) of the system 10. As an example, as shown in FIG. 3, each zone may have one or more fixed components of the sensor network 30 and task performance equipment 20 associated therewith. For example, moisture sensor 250 (indicated by a cross) may be accompanied by a corresponding sprinkler 260 (indicated by a star). Other crosses in the image of FIG. 3 may represent other sensors (e.g., moisture sensors 250), and other stars may represent other task performance equipment 20 (e.g., sprinklers 260) associated with other zones. Moreover, in some cases, one or more of the sprinklers 260 may be operable via actuation of an actuator 265. The actuator 265, and other actuators in the system, may be associated with one or more electric, hydraulic or otherwise locally or remotely operable devices that can take one or more other devices into or out of service when operated.

In some embodiments, a single sensor of any given type may be associated with a given zone. By providing only one sensor of any given type per zone, the sensor data gathered from each respective sensor may be easily understood to represent the conditions for the entirety of the zone. In such an example, one piece of task performance equipment 20 of any given type may also be employed in the simplest examples. Moreover, in some cases, there may be one piece of task performance equipment 20 associated with each respective sensor of a given type. In fact, in some cases, there may be a limit to the distance that is permitted to be placed between a sensor of a given type (e.g., a moisture sensor 250) and a piece of task performance equipment 20 that corresponds to the sensor (e.g., a sprinkler 260). Thus, for example, each moisture sensor 250 may be no more than a given distance from a corresponding sprinkler 260. Moreover, in some cases, the sprinkler 260 and moisture sensor 250 may be integrated with each other. However, it should be appreciated that, dependent upon the characteristics of the task performance equipment 20, it may be desirable for multiple pieces of task performance equipment 20 to be provided in one or more of the zones, or in association with a sensor of a given type. Similarly, it may be desirable for multiple sensors to be associated with a single piece of task performance equipment 20.

In other embodiments, multiple sensors (even of a given type) and multiple pieces of task performance equipment 20 (even of a given type—lighting element, watering device, fertilizer, trimmer, mower, camera, etc.) may be associated with a given zone. However, it should be appreciated that in such an embodiment, the associations of different assets within the zone may effectively (or actually), although not necessarily, create sub-zones that can be collectively or individually managed. The active zone 240 is an example of such a zone.

For physical connections made between assets, wiring and/or hose connections for power, communication or other sourcing services may be accomplished in any desirable fashion, but may be programmed into or otherwise known by the application manager 40. Wireless communications (if employed) may be accomplished by short range or other radios that may be in communication with sensors or other assets. For example, Bluetooth, WiFi, Zigbee, RFID (near field communication), GSM, or other proprietary or standard based communication mechanisms may be employed. In some embodiments, if one or more sensors are collocated with each other or with task performance equipment 20, a group of devices may communicate with a communication hub (which may be one of the sensors or devices) and the hub may wirelessly (or via wired connection) report data to the application manager 40. Power may also be supplied locally by battery or solar cells that may be disposed proximate to one or more of the assets, or by power cables routed to one or more of the assets.

When the assets include sprinklers, the sprinklers 260 may be provided with water from one or more hose or pipe connections. In some cases, multiple sprinklers 260 may be sourced from the same hose (e.g., in series or parallel). Control over sprinkler operations may be accomplished by charging the hose without local control or by charging the hose and taking individual control over valves provided for local control of each sprinkler 260 via electronic control. Other irrigation tools (e.g., an irrigation crane) may also be used in other example embodiments.

In some embodiments, in addition to employing the fixed assets described above, one or more mobile assets may be employed. Within such a context, for example, a robotic mower or watering device may be used to facilitate collection of data and/or the execution of tasks. Although any mobile asset could be employed, an example embodiment will be described herein within the context of a robotic lawn mower or watering device acting as the robotic vehicle 15. As described above, the robotic vehicle 15 may work within a work area defined by a boundary wire or other method. In some cases, the robotic vehicle 15 may perform a task (e.g., grass cutting or lawn watering (e.g., via transport of a small (e.g., 5 mm or less) hose linked to a water source via a hose reel) over the parcel 200. The robotic vehicle 15 may be equipped with an RFID reader to read the RFID tag of one or more sensors and/or pieces of task performance equipment 20. In some cases, the robotic vehicle 15 may include a positioning module 780 that is capable of noting the location at which one or more RFID tags was read. Accordingly, the robotic vehicle 15 may be able to obtain geographic location information for mapping the location of assets. As such, the locations of devices in the system 10 may be learned.

Alternatively or additionally, in some cases, the robotic vehicle 15 may further read data from the corresponding sensors that it encounters while operating. The robotic vehicle 15 may store such data or transmit it to the application manager 40 wirelessly. If the data is stored, the data may be transmitted to the charging station or a communication device associated therewith when the robotic vehicle 15 docks for charging. The communication device may then communicate the data to the application manager 40. In some cases, the boundary wire may be used to power the sensors and/or the communication device. Moreover, in some cases, the boundary wire could even be used as a temporary or ad hoc transmission asset (e.g., acting as an antenna).

In some examples, low power short range communications may be used between the robotic vehicle 15 and the sensor network 30, communication hubs, and/or task performance equipment 20. Then the robotic vehicle 15 may use higher power communications to pass information on to the application manager 40 and receive instructions therefrom. Alternatively, the robotic vehicle 15 may also use low power communications when docked for recharging. The robotic vehicle 15 may then again use low power short range communications to direct certain activities such that the overall power consumption is kept low by ensuring that a minimum amount of power is used for system communications.

Furthermore, in some embodiments, the robotic vehicle 15 itself may be used to power the sensor network 30 when the robotic vehicle 15 is proximate to the sensors. In this regard, similar to the operation of an RFID tag, the robotic vehicle 15 may radiate signals that can be used by sensors proximate thereto to take measurements and transmit data measured to the robotic vehicle 15. Thus, for example, inductive power provision may be accomplished to transfer power to remote assets within the system 10. Power transfer or communication in this manner can be accomplished at relatively low power levels due to the proximity of the robotic vehicle 15 to the sensors or other devices that are being powered and/or communicated with. In some cases, the robotic vehicle 15 may also provide power to one or more of the sensors or the task performance equipment 20. For example, the sensor network 30 and/or task performance equipment 20 may have batteries that may be rechargeable by the robotic vehicle 15 transferring power from its own batteries to the batteries of the one or more sensors/task performance equipment via inductive or wireless power transfer. Physical contact may be employed for such power transfers in some cases as well.

In some embodiments, the robotic vehicle 15 may further act as a mobile sensor. In this regard, for example, the robotic vehicle 15 may carry a camera 95 on board, and the camera 95 may record video or obtain image data associated with respective locations or zones. The image data, in addition to its potential use in location determination described above, may be analyzed to determine the color, size, length, or overall health of vegetation or may be used to augment security functions. Information regarding color, size, length, or overall health of vegetation may then be used to determine the growing conditions impacting the vegetation.

The robotic vehicle 15 may also directly sense water drops from the watering system or otherwise sense moisture on the parcel. The application manager 40 may then adjust watering, lighting, and/or fertilizing instructions to modify growing conditions accordingly. As such, the robotic vehicle 15 may be configured to sense water distribution patterns and feed the information back into the system 10 so that setup and calibration may be achieved for optimal performance.

Other sensors or functional components 700 may also be integrated into or otherwise provided onto the robotic vehicle 15. For example, temperature sensors, cameras, radio receivers/transmitters, watering tools, cutting devices, moisture sensors, light sensors, lighting devices, and/or the like may be included with the robotic vehicle 15 to enable condition checks to be made at random or specifically selected locations throughout the parcel 200. Thus, the robotic vehicle 15 may act as a mobile platform capable of hosting one or more sensors and, in some cases, one or more pieces of task performance equipment 20. However, as indicated above, the robotic vehicle 15 may also interact with (or even power) fixed sensors and/or task performance equipment 20.

As such, for example, watering (or some other task) may be commenced and the system 10 may employ the sensor network 30 in combination with operation of the robotic vehicle 15 to monitor the distribution of the water (or fertilizer, etc.). The sensor network 30 may be transported to different locations, or data may be collected at different locations by the robotic vehicle 15 and then be used to provide feedback via the application manager 40 to direct more or less watering (or other resource utilization) in certain areas.

In some cases, the robotic vehicle 15 may be controlled to ensure that synchronization or sequencing can occur relative to the tasks performed on the parcel 200. For example, mowing can be secured while watering occurs in a given zone, or mowing can be planned a specific given time after watering has been accomplished. Moreover, since in some cases the sensor network 30 can detect natural watering (e.g., rain) and irrigation efforts, the application manager 40 may be enabled to manage resource consumption to optimize water utilization based on prevailing weather conditions. For example, if a rain event is detected, watering may be postponed. In some cases, the magnitude of a rain event may also be detected so that watering postponement may be accomplished for a time that is proportional to the amount of rain received. In still further examples, if the network 50 enables the application manager 40 to obtain weather forecast information (e.g., from the internet), then watering may be postponed even if a rain event has not yet occurred (e.g., if the rain event is forecast to occur within a given time period of an otherwise scheduled or apparently needed watering event). Thus, for example, the application manager 40 may access weather information from sites associated with the location of the parcel 200, or the application manager 40 may be enabled to utilize a subscription to a weather service to obtain forecast information.

In some embodiments, the robotic vehicle 15 may further include a mechanical operator of some sort. In this regard, for example, the sprinklers 260 of some embodiments could be embodied as irrigation cranes that may be mechanically turned on or off by the mechanical operator of the robotic vehicle 15. In such an embodiment, when directed, the robotic vehicle 15 may go to the location of one or more mechanical cranes that are to be turned on (or off) and the robotic vehicle 15 may engage the corresponding irrigation cranes with the mechanical operator to accomplish the desired result. Thus, in various example embodiments, the robotic vehicle 15 may interact with sprinklers, valves, actuators, cranes, etc., in either a mechanical or electrical manner in order to turn such devices on or off responsive to instruction by the application manager 40 based on sensed conditions.

Accordingly, the robotic vehicle 15 may be configured to facilitate activity related to data collection (enabling low power near field or other short range communication), power provision, direct task performance, and indirect task performance (e.g., via equipment manipulation via electrical or mechanical methods). Battery replacement needs or power consumption in general may therefore be kept to a minimum. Moreover, given the ability of the robotic vehicle 15 to act as a mobile sensor, it may be possible in some cases to use the robotic vehicle 15 as the only sensor or sensing device platform within the system 10. The robotic vehicle 15 may facilitate placement of devices within the system 10 through detection and calibration techniques via the provision of feedback regarding the distribution of water or other growing condition changing resources over the parcel 200.

Figure 4:
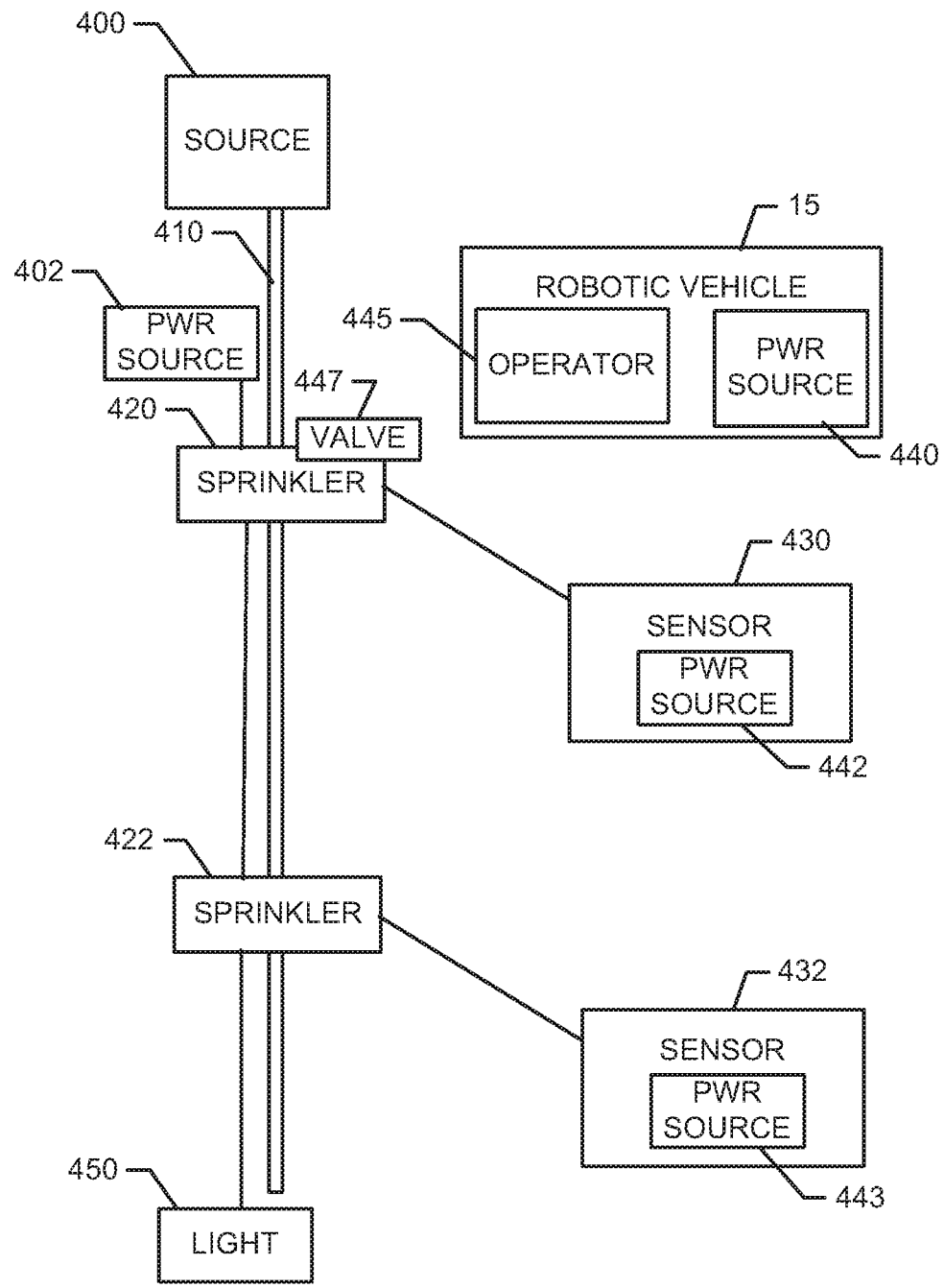
FIG. 4 illustrates a simple water migration path with power provided to sensors remotely according to an example embodiment.

FIG. 4 illustrates a water migration path that may be practiced in connection with an example embodiment. However, it should be appreciated that some of the components may be removed in simpler example embodiments. Thus, the example of FIG. 4 is not provided to be limiting in relation to the components included in the system, but merely to show various examples of some components that may be included in one example system. As shown in FIG. 4, a water source 400 may be used to charge a water line 410. A first sprinkler 420 and a second sprinkler 422 may receive water from the water line 410. The water line 410 may be selectively charged to provide water for spraying from the first and second sprinklers 420 and 422. In this example, a power source 402 may also be provided to power various system components. In some cases, the power source 402 may power the sprinklers, actuators of the sprinklers and/or the sensors of the system (including first sensor 430 and second sensor 432). As shown in FIG. 4, the application manager 40 may communicate with the robotic vehicle 15 either directly via a wireless link, or via the charging station 540 when docking occurs. An operator may also interact with the system via the network using a remote terminal. Other system components may also be controlled in accordance with some example embodiments.

As mentioned above, the robotic vehicle 15 may interact with components of the system. Thus, FIG. 4 further illustrates a power source 440 for the robotic vehicle 15 and power sources 442 and 443 for the sensors 430 and 432. The robotic vehicle 15 can power the sensors 430 and 432 via power transfer from the power source 440 to power sources 442 and 443 via wired or wireless connection. Also, the robotic vehicle 15 may include an operator 445 to operate valve 447 on sprinkler 420, for example. Although not specifically shown, the valve 447 and/or other components of the sprinkler 420 (or any other task performance equipment) may include batteries that may receive power from the power source 440 of the robotic vehicle 15 as described above.

In an example embodiment, the memory 114 may store (or the processor 112 may otherwise access) a database (e.g., a growing condition database). Such database may correlate certain plants to the corresponding growing conditions that are ideal or preferred for optimal growth. As described above, current conditions may be monitored by the sensor network 30 and compared to the information in the database to determine any corrective action to be taken via the task performance equipment 20. Reduced costs and reduced environmental impact may therefore be achieved while achieving more optimal growing conditions.

In some cases, the application manager 40 may take automated action to improve growing conditions by controlling watering, fertilizing, cutting, lighting or other activities based on a determination that current conditions are not optimal. However, in other situations, the application manager 40 may be configured to provide an alert or instructions locally or via a smart phone or other remote device, to instruct or otherwise inform the owner/operator that some changes to current conditions may be advisable. The specific actions recommended may be identified, or an alert to check certain conditions may be provided. Accordingly, a relatively robust system for control of lawn conditions may be provided in an automated fashion. The result may be deemed to operate as a "smart lawn" that provides efficient control to achieve optimal growing conditions.

Embodiments of the present invention may therefore be practiced using an apparatus in connection with the system of FIGS. 1-4. In an example embodiment, a robotic vehicle 15 (e.g., a robotic mower, a mobile sensing device, a watering device and/or the like) is provided with a positioning module 780, a mapping module 760, a vegetation analyzer 770, and a sensor network 30. The positioning module 780 may be configured to utilize one or more sensors to determine a location of the robotic vehicle 15 and direct continued motion of the robotic vehicle 15. The mapping module 760 may be configured to map a parcel or operate the robotic vehicle 15 relative to a map. The vegetation analyzer 770 may be configured to utilize one or more sensors to measure lawn conditions. The sensor network 30 may be configured to collect data (e.g., plant stress). Other structures may also be provided, and other functions may also be performed as described in greater detail below.

In an example embodiment, the robotic vehicle 15 (e.g., a robotic mower, mobile sensing device, watering device and/or the like) is provided with a camera 95 in addition to any other sensors or functional components 700 that the robotic vehicle 15 may carry. The camera 95, and perhaps also other sensor equipment, may be configured to gather image data and other information during operation of the robotic vehicle 15 on the lawn (i.e., on the parcel 200). The image data may be combined with positioning information to generate a model (e.g., a 2D or 3D model) of the parcel 200. The user may then interact with the model to undertake a variety of activities including, for example, defining work areas and/or tasks to be performed in various areas, recording content for presentation in association with the time the content was recorded to provide an event log with accessible image content, detecting/notifying the operator of various changes to the environment, and/or the like. Other functions may also be performed as described in greater detail below.

Figure 5:
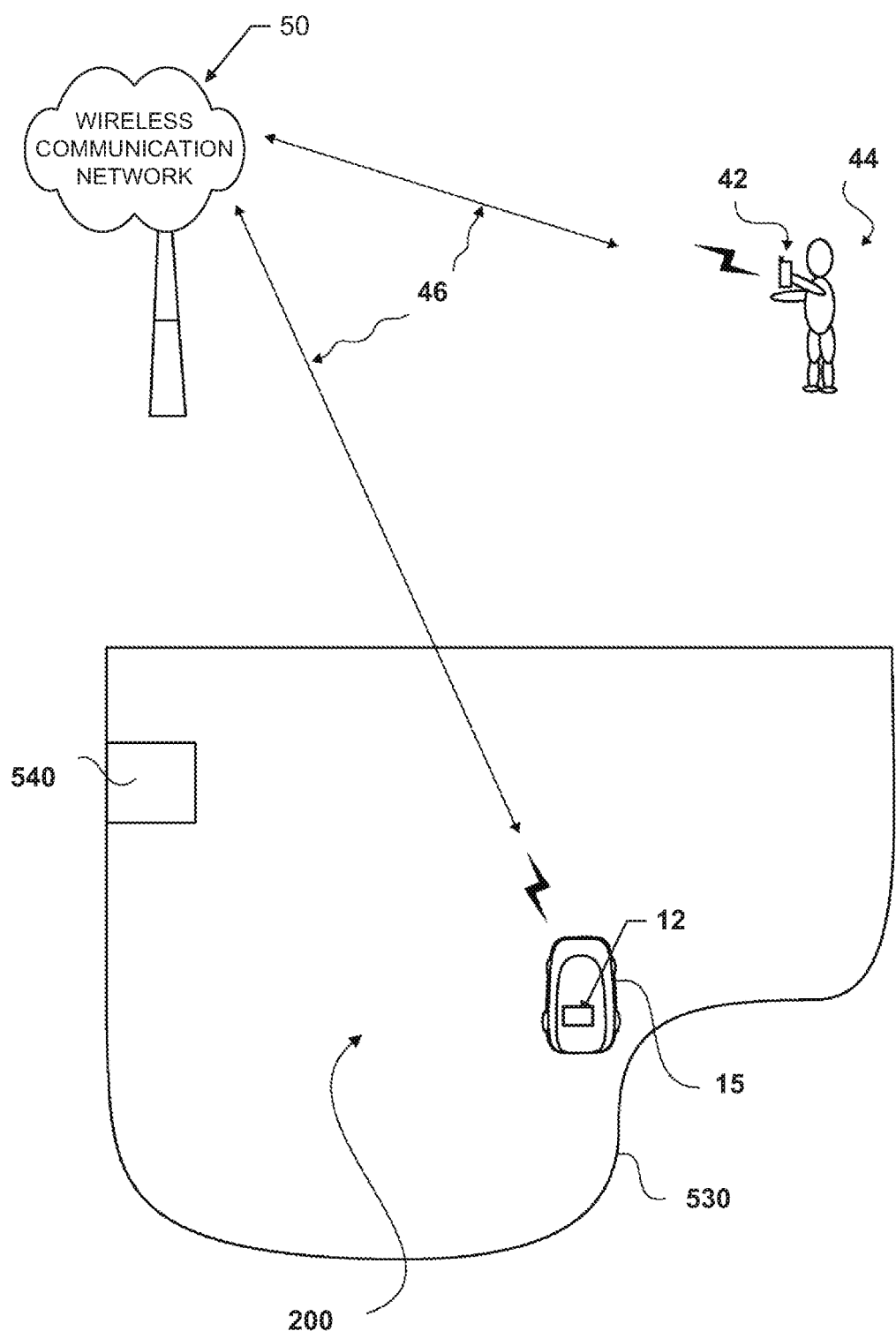
FIG. 5 illustrates an example operating environment for a robotic mower.

FIG. 5 illustrates an example operating environment for a robotic mower 15 that may be employed in connection with an example embodiment. However, it should be appreciated that example embodiments may be employed on numerous other robotic vehicles, so the robotic mower 15 should be recognized as merely one example of such a vehicle. The robotic mower 15 may operate to cut grass on a parcel 200 (i.e., a lawn), the boundary 530 of which may be defined using one or more physical boundaries (e.g., a fence, wall, curb and/or the like), a boundary wire, programmed location based boundaries or combinations thereof. When the boundary 530 is a boundary wire, the boundary wire may emit electrical signals that are detectable by the robotic mower 15 to inform the robotic mower 15 when the boundary 530 of the parcel 200 has been reached. Several robotic vehicles (e.g., a robotic watering vehicle) may operate in similarly defined areas, but an example embodiment will be described herein in connection with a robotic mower 15. However, it should be appreciated that example embodiments are not limited to application only on robotic mowers. Instead, example embodiments may also be practiced in connection with other robotic vehicles that operate within bounded regions.

The robotic mower 15 may be controlled, at least in part, via control circuitry 12 located onboard. The control circuitry 12 may include, among other things, a positioning module 780 and a sensor network 30, which will be described in greater detail below. Accordingly, the robotic mower 15 may utilize the control circuitry 12 to define a path for coverage of the parcel 200 in terms of performing a task over specified portions or the entire parcel 200. In this regard, the positioning module may be used to guide the robotic mower 15 over the parcel 200 and to ensure that full coverage (of at least predetermined portions of the parcel 200) is obtained, while the sensor network 30 may gather data regarding the surroundings of the robotic mower 15 while the parcel 200 is traversed.

If a sensor network 30 is employed, the sensor network 30 may include sensors related to positional determination (e.g., a GPS receiver, an accelerometer, a camera, an inertial measurement unit and/or the like). Thus, for example, positional determinations may be made using GPS, inertial navigation, optical flow, visual location (e.g., VSLAM) and/or other positioning techniques or combinations thereof. Accordingly, the sensors may be used, at least in part, for determining the location of the robotic mower 15 relative to boundaries or other points of interest (e.g., a starting point or other key features) of the parcel 200, or determining a position history or track of the robotic mower 15 over time. The sensors may also detect collision, tipping over, or various fault conditions. In some cases, the sensors may also or alternatively collect data regarding various measurable parameters (e.g., moisture, nutrient stress, weed infestations, pest infestations, etc.) associated with particular locations on the parcel 200.

In an example embodiment, the robotic mower 15 may be battery powered via one or more rechargeable batteries. Accordingly, the robotic mower 15 may be configured to return to a charge station 540 that may be located at some position on the parcel 200 in order to recharge the batteries. The batteries may power a drive system and a blade control system of the robotic mower 15. However, the control circuitry 12 of the robotic mower 15 may selectively control the application of power or other control signals to the drive system and/or the blade control system to direct the operation of the drive system and/or blade control system. Accordingly, movement of the robotic mower 15 over the parcel 200 may be controlled by the control circuitry 12 in a manner that enables the robotic mower 15 to systematically traverse the parcel while operating a cutting blade to cut the grass on the parcel 200. In cases where the robotic vehicle is not a mower, the control circuitry 12 may be configured to control another functional or working assembly that may replace the blade control system and blades.

In some embodiments, the control circuitry 12 and/or a communication node at the charge station 540 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 50. The wireless communication network 50 may provide operable coupling between the remote operator 44 and the robotic mower 15 via the electronic device 42, which may act as a remote control device for the robotic mower 15. However, it should be appreciated that the wireless communication network 50 may include additional or internal components that facilitate the communication links and protocols employed. Thus, some portions of the wireless communication network 50 may employ additional components and connections that may be wired and/or wireless. For example, the charge station 540 may have a wired connection to a computer or server that is connected to the wireless communication network 50, which may then wirelessly connect to the electronic device 42. As another example, the robotic mower 15 may wirelessly connect to the wireless communication network 50 (directly or indirectly) and a wired connection may be established between one or more servers of the wireless communication network 50 and a PC of the remote operator 44. In some embodiments, the wireless communication network 50, which was discussed above and will not be repeated here, may couple the robotic mower 15 to devices such as processing elements (e.g., personal computers, server computers or the like) or databases. Accordingly, communication between the wireless communication network 50 and the devices or databases (e.g., servers, electronic device 42, control circuitry 12) may be accomplished by either wireline or wireless communication mechanisms and corresponding protocols.

Figure 6:
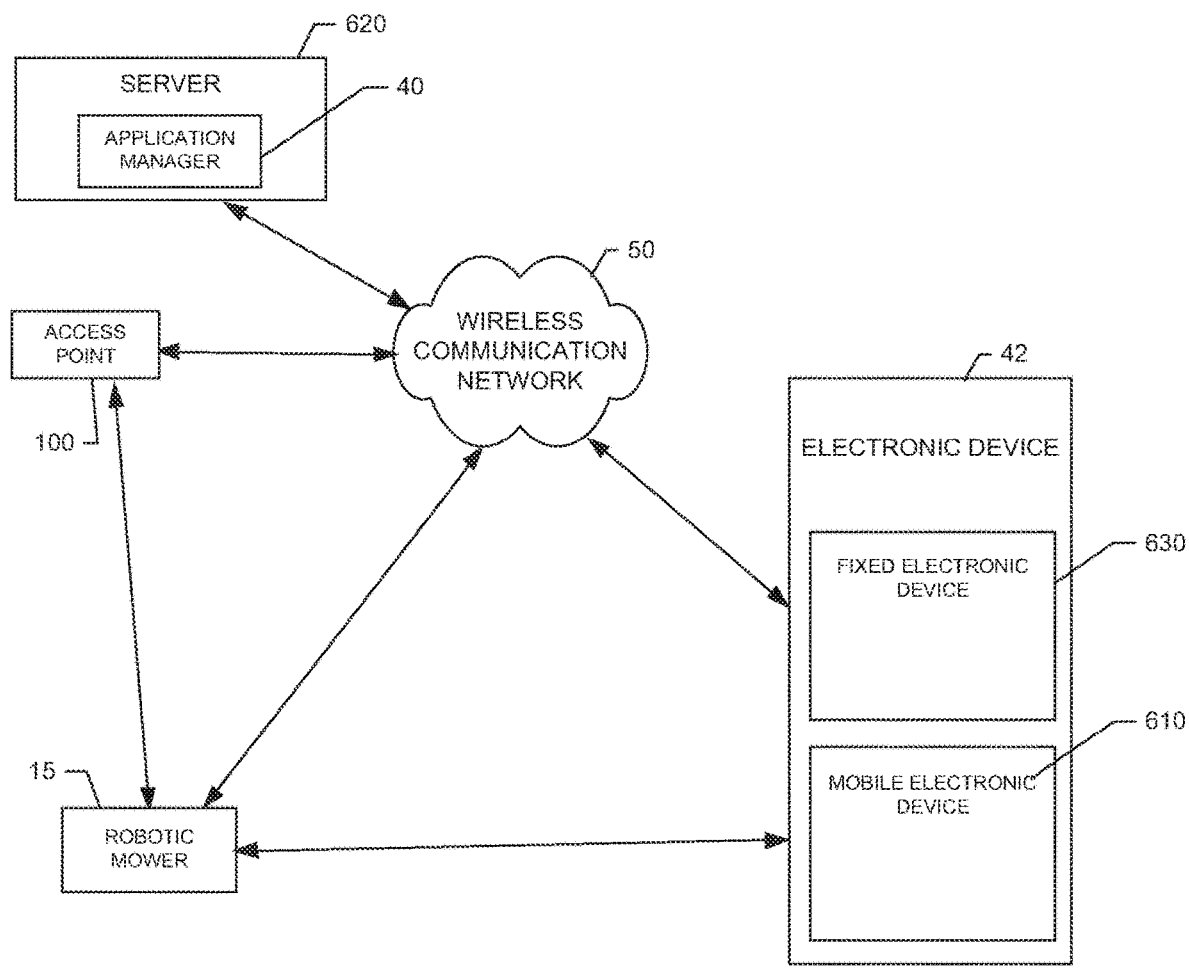
FIG. 6 illustrates a block diagram of a communication network of the robotic mower according to an example embodiment.

FIG. 6 illustrates a block diagram of a communication network of the robotic mower in accordance with an example embodiment. As can be seen from FIG. 6, the wireless communication network 50 (e.g., the internet) may be capable of providing communication between the electronic device 42 and the robotic mower 15. When communication is established between the wireless communication network 50 and the robotic mower 15, the communication may be established using any suitable wireless communication mechanism such as, for example, second-generation (2G) wireless communication protocols IS-136 (TDMA), GSM, and IS-95 (CDMA), third-generation (3G) wireless communication protocols, such as UMTS, CDMA2000, WCDMA and TD-SCDMA, LTE or E-UTRAN, fourth-generation (4G) wireless communication protocols or the like. However, in some cases, a wireless access point 100 may be provided in association with the parcel 200 to serve the robotic mower 15. The wireless access point 100 may have a wired or wireless connection to the wireless communication network 50, and may then employ a short range communication protocol (e.g., WiFi, Bluetooth, or the like) to communicate with the robotic mower 15.

Regardless of the particular communication mechanism employed, it should be appreciated that user interaction between the electronic device 42 and the robotic mower 15 is facilitated by example embodiments. In some cases, information regarding the robotic mower 15, the parcel 200, the remote operator 44, account details associated with any of the foregoing, and/or the like, may be stored "in the cloud." For example, a server 620 may be provided as part of, or in communication with, the wireless communication network 50. The server 620 may include memory and/or processing components to store data and execute functionality associated with the employment of example embodiments. Thus, for example, instructions for operation of the robotic mower 15, data (e.g., plant stress data and/or the like) to be collected, registered users or devices, and/or other information may be stored at the server 620.

In some cases, the manufacturer may provide an identifier, vehicle identification number, or other such identifying information regarding each robotic vehicle produced to the server 620 (or an instance thereof). The identification information may uniquely identify each instance of robotic vehicle and enable each respective robotic vehicle to be registered to a user, organization, parcel and/or user account. The server 620 may therefore store account information and correlate various account settings, programs, instructions, applications and/or the like, with the account generally or in association with all or particular ones of the robotic vehicles registered to the account. In some examples, actions of the server 620 may be controlled, managed, or coordinated by a controlling device (e.g., application manager 40). The server 620 may interact with the electronic device 42 and/or the robotic mower 15 (or other robotic vehicles) individually in sequence or simultaneously in order to update, modify, execute or otherwise perform functions associated with the accounts and vehicles associated with the accounts.

In some embodiments, in addition or as an alternative to the mobile electronic device 610, the electronic device 42 could be embodied as a fixed electronic device 630 (e.g., a PC, computer terminal and/or the like). Thus, the remote operator 44 could be enabled to control the robotic mower 15 via the fixed electronic device 630 or via the mobile electronic device 610 (e.g., a smart phone, tablet, laptop, etc.). In some cases, the user may be enabled to log into an account associated with the user (or with the parcel 200, an organization responsible for the parcel 200, and/or the like) to manage tasks or data associated with the robotic mower 15 that may be associated with the account.

Figure 7:
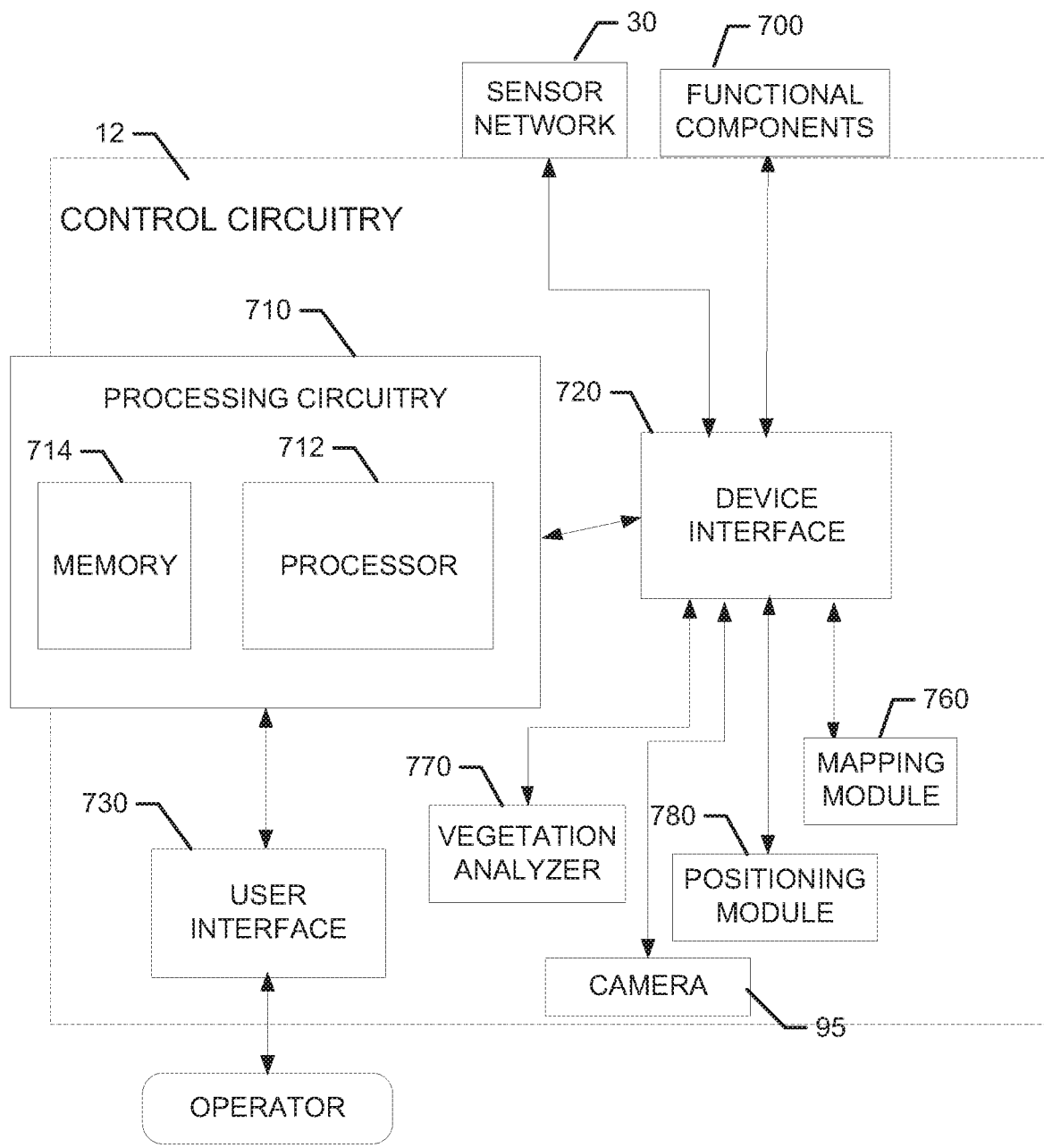
FIG. 7 illustrates a block diagram of various components of control circuitry to illustrate some of the components that enable or enhance the functional performance of the robotic mower and to facilitate description of an example embodiment.

Some examples of the interactions that may be enabled by example embodiments will be described herein by way of explanation and not of limitation. FIG. 7 illustrates a block diagram of various components of the control circuitry 12 to illustrate some of the components that enable the functional performance of the robotic mower 15 and to facilitate description of an example embodiment. In some example embodiments, the control circuitry 12 may include or otherwise be in communication with a positioning module 780, a mapping module 760, a vegetation analyzer 770, and/or a sensor network 30 disposed at the robotic mower 15. As such, for example, the functions attributable to the positioning module 780, mapping module 760, vegetation analyzer 770, and/or the sensor network 30 may be carried out by, under the control of, or in cooperation with the control circuitry 12. In some embodiments, the positioning module 780, mapping module 760, and/or vegetation analyzer 770 may be part of a sensor network 30 of the robotic mower 15. However, in some cases, the positioning module 780, mapping module 760, and/or vegetation analyzer 770 may be in communication with the sensor network 30 to facilitate operation of each respective module.

In some examples, one or more of the positioning module 780, the vegetation analyzer 770, and the mapping module 760 may further include or be in communication with a camera 95 other imaging device. The camera 95 may be a part of the sensor network 30, part of any of the modules described above, or may be in communication with one or more of the modules to enhance, enable or otherwise facilitate operation of respective ones of the modules. The camera 95 may include an electronic image sensor configured to store captured image data (e.g., in memory 714). Image data recorded by the camera 95 may be in the visible light spectrum or in other portions of the electromagnetic spectrum (e.g., NIR camera). In some cases, the camera 95 may actually include multiple sensors configured to capture data in different types of images (e.g., RGB and NIR sensors). The camera 95 may be configured to capture still images and/or video data.

The robotic mower 15 may also include one or more functional components 700 that may be controlled by the control circuitry 12 or otherwise be operated in connection with the operation of the robotic mower 15. The functional components 700 may include a wheel assembly (or other mobility assembly components), one or more cutting blades and corresponding blade control components, and/or other such devices. In embodiments where the robotic vehicle is not a mower, the functional components 700 may include equipment for taking soil samples, operating valves, distributing water, fertilizer, seed, powder, pellets or chemicals, and/or other functional devices and/or components.

The control circuitry 12 may include processing circuitry 710 that may be configured to perform data processing, control function execution and/or other processing and management services according to an example embodiment of the present invention. The processing circuitry 710, processor 712, memory 714 and device interface 720 may be similar in function (and in some cases also form) to the processing circuitry 110, processor 112, memory 114 and device interface 120 described above. Thus, specific descriptions of these components will not be repeated.

In an example embodiment, the processor 712 (or the processing circuitry 710) may be embodied as, include or otherwise control the positioning module 780, the vegetation analyzer 770, and the mapping module 760. As such, in some embodiments, the processor 712 (or the processing circuitry 710) may be said to cause each of the operations described in connection with the positioning module 780, the vegetation analyzer 770, and the mapping module 760 by directing the positioning module 780, the vegetation analyzer 770, and the mapping module 760, respectively, to undertake the corresponding functionalities responsive to execution of instructions or algorithms configuring the processor 712 (or processing circuitry 710) accordingly. These instructions or algorithms may configure the processing circuitry 710, and thereby also the robotic mower 15, into a tool for driving the corresponding physical components for performing corresponding functions in the physical world in accordance with the instructions provided.

In an exemplary embodiment, the memory 714 may include one or more non-transitory memory devices such as, for example, volatile and/or non-volatile memory that may be either fixed or removable. The memory 714 may be configured to store information, data, applications, instructions or the like for enabling the positioning module 780, the vegetation analyzer 770, and the mapping module 760 to carry out various functions in accordance with exemplary embodiments of the present invention. For example, the memory 714 could be configured to buffer input data for processing by the processor 712. Additionally or alternatively, the memory 714 could be configured to store instructions for execution by the processor 712. As yet another alternative, the memory 714 may include one or more databases that may store a variety of data sets responsive to input from various sensors or components of the robotic mower 15. Among the contents of the memory 714, applications may be stored for execution by the processor 712 in order to carry out the functionality associated with each respective application.

The applications may include applications for controlling the robotic mower 15 relative to various operations including determining an accurate position of the robotic mower 15 (e.g., using one or more sensors of the positioning module 780). Alternatively or additionally, the applications may include applications for controlling the robotic mower 15 relative to various operations including determining lawn conditions via water stress, nutrient stress, weed infestations, and/or pest infestations (e.g., using one or more sensors of the vegetation analyzer 770). Alternatively or additionally, the applications may include applications for controlling the robotic mower 15 relative to various operations including mapping a parcel or operating the robotic mower 15 relative to a map (generated or provided) (e.g., using one or more sensors of the mapping module 760). Alternatively or additionally, the applications may include applications for controlling the camera 95 and/or processing image data gathered by the camera 95 to execute or facilitate execution of other applications that drive or enhance operation of the robotic mower 15 relative to various activities described herein.

In some cases, information associated with the positioning module 780 and/or the sensor network 30 may be extracted from the robotic mower 15 and mated with a remote network terminal or computer. The information stored on the memory 714 may then be extracted and thereby reported for fleet management or other applications. In other cases, the device interface 720 may be configured to wirelessly transmit information associated with the positioning module 780 and/or the sensor network 30 to a remote computer to enable data processing to be accomplished on the remote computer. For example, in some cases, Bluetooth, WiFi or other wireless communication modules may be provided by the device interface 720 in order to allow wireless downloading of software, support information or other data, or allow wireless uploading of data to network devices for support, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 714 to the removable memory device and thereafter to the remote computer. Thus, in some embodiments, lawn condition data may be communicated to an external computer and may be manipulated thereat, or may be correlated to other lawn condition information (e.g., patterns of collected lawn condition data).

The user interface 730 (if implemented) may be in communication with the processing circuitry 710 to receive an indication of a user input at the user interface 730 and/or to provide an audible, visual, mechanical or other output to the user. As such, the user interface 730 may include, for example, a display, one or more buttons or keys (e.g., function buttons), and/or other input/output mechanisms (e.g., microphone, speakers, cursor, joystick, lights and/or the like).

The device interface 720 may include one or more interface mechanisms for enabling communication with other devices either locally or remotely. In some cases, the device interface 720 may be any means such as a device or circuitry embodied in either hardware, or a combination of hardware and software that is configured to receive and/or transmit data from/to sensors or other components in communication with the processing circuitry 710. In some example embodiments, the device interface 720 may provide interfaces for communication of data to/from the control circuitry 12, the positioning module 780, the vegetation analyzer 770, the mapping module 760, the sensor network 30, the camera 95 and/or other functional components 700 via wired or wireless communication interfaces in a real-time manner, as a data package downloaded after data gathering or in one or more burst transmission of any kind.

Each of the positioning module 780, the vegetation analyzer 770, and the mapping module 760 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 12 of the robotic mower 15. The modules may share some parts of the hardware and/or instructions that form each module, or they may be distinctly formed. As such, the modules and components thereof are not necessarily intended to be mutually exclusive relative to each other from a compositional perspective.

The positioning module 780 may be configured to utilize one or more sensors (e.g., of the sensor network 30) to determine a location of the robotic mower 15 and direct continued motion of the robotic mower 15 to achieve appropriate coverage of the parcel 200. As such, the robotic mower 15 (or more specifically, the control circuitry 12) may use the location information to determine a mower track and provide full coverage of the parcel 200 to ensure the entire parcel is mowed. The positioning module 780 may therefore be configured to direct movement of the robotic mower 15, including the speed of the robotic mower 15.

In an example embodiment, the positioning module 780 may be configured to incorporate input from a plurality of sources (e.g., among sensor network 30 components that can generate an estimated position or cooperate to generate an estimated position) to generate a composite position based on the position information received from each of the various sources available. Thus, for example, each sensor (or at least multiple sensors) may provide separate information that can be used by the positioning module 780 to determine a corresponding position estimate. Each position estimate may also have a weight associated therewith based on time, accuracy estimates or other factors. The positioning module 780 may then calculate the composite position based on a weighted average of the individual position estimates from each respective source that has an input to provide. In some cases, predicted positions may further be determined based on current inputs, system model information and previous state information.

In some example embodiments, rather than (or in addition to) estimating a composite position, the positioning module 780 may be configured to rank or order position estimates based on a confidence score associated with each position input provided from the various sources available. The position estimate with the highest confidence score may then be selected as the current estimated position. Additionally or alternatively, the positioning module 180 may be configured to use one or more of the available sensors as a primary sensor for determining position. The positioning module 780 may also be configured to "reset" or update the primary sensor as appropriate if a more accurate position source becomes available (e.g., as in the example of resetting the IMU 850 when a more accurate position source is available).

Various sensors of sensor network 30 of the robotic mower 15 may be included as a portion of, or otherwise communicate with, the positioning module 780 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver, SIM card, and/or accelerometer) may be included to monitor, display and/or record data regarding vehicle position and/or orientation as part of the positioning module 780.

In an example embodiment, the vegetation analyzer 770 may be configured to utilize one or more sensors (e.g., of the sensor network 30) to determine plant stress and direct lawn maintenance in response to the plant stress. As such, the robotic mower 15 (or more specifically, the control circuitry 12) may enable continuous monitoring and maintenance of lawn wellness. The vegetation analyzer 770 may therefore be configured to detect water stress and nutrient stress in the lawn. In some cases, the vegetation analyzer 770 may be further configured to detect weed infestations or pest infestations.

Various sensors of sensor network 30 of the robotic mower 15 may be included as a portion of, or otherwise, communicate with, the vegetation analyzer 770 to, for example, determine lawn conditions in various portions of the lawn.

In an example embodiment, the mapping module 760 may be configured to operate in a map generation (or update) mode or in a navigation mode. In the map generation mode, the mapping module 760 may be configured to incorporate input from any available input sources of the sensor network 30 in order to account for current position of the robotic mower 15 and any detected lawn conditions in order to generate a map of the parcel 200 (or portions thereof) responsive to traversal of the parcel 200 by the robotic mower 15. As such, the mapping module 760 may receive position information from the positioning module 780 and lawn condition information from the vegetation analyzer 770 to generate map data that can be illustrated locally or remotely as a graphical display of a map of the parcel 200.

In an example embodiment, the mapping module 780 may be configured to operate in a map generation (or update) mode or in a navigation mode. In the map generation mode, the mapping module 760 may be configured to incorporate input from any available input sources of the sensor network 30 in order to account for current position of the robotic mower 15 and lawn condition information in order to generate a map of the parcel 200 (or portions thereof) responsive to traversal of the parcel 200 by the robotic mower 15. As such, the mapping module 760 may receive position information from the positioning module 780 and lawn condition information from the vegetation analyzer 770 to generate map data that can be illustrated locally or remotely as a graphical display of a map of the parcel 200.

In some cases, the mapping module 760 may track position data (e.g., provided from the IMU 850, GPS 852, SIM card 854, or another position source) and record lawn condition information relative to the position of the robotic mower 15 (e.g., from the camera 95, etc.) to generate the map data. The position data may also include information indicative of terrain features (e.g., bumps, hills, edges, etc.) that are detectable by the IMU 850, if applicable. Thus, the map data may, in some cases, provide a map of the parcel 200.

Lawn conditions may be defined on the map in any suitable form. In this regard, in some cases, the map data may be converted into a model or image of the parcel 200 that can be displayed to merely show lawn conditions in a rudimentary form, or animation, graphic overlays, icons and/or other techniques may be employed to generate a sophisticated map view that may be exported to devices with more capable displays (e.g., the electronic device 42), or that may be displayed on a display device of the robotic mower 15 itself.

As indicated above, the robotic mower 15 may also be configured to utilize the sensor network 30 and modules described above to engage in other functions indicative of intelligent vehicle autonomy. In this regard, for example, different tasks may be defined relative to different zones or at different times. In some cases, the user may be enabled to see the map view on a device (e.g., the electronic device 42) and select zones, a scheduling menu, autonomous operation settings, or other interaction mechanisms to define tasks for certain zones at certain times. Instructions may be provided to mow at different times, at different heights, in specific patterns, or with selected frequency in each respective zone. Alternatively or additionally, in embodiments where a robotic vehicle other than the robotic mower 15 is employed for performing tasks on the parcel 200, the robotic vehicle can be configured to autonomously traverse the parcel 200 to check soil conditions, monitor the health of grass or other plants, direct the application of water, fertilizer, chemicals, etc., or engage in other programmed activities.

Accordingly, the robotic mower 15 (or other robotic vehicle) may be provided with the positioning module 780, the vegetation analyzer 770, and the mapping module 760 to process sensor data received from the sensor network 30 and/or the camera 95. The robotic mower 15 may therefore be capable of accurately determining its position and gathering information about its surroundings. With accurate position determining capabilities, and the ability to experience its surroundings with multiple sensors, the robotic mower 15 may be configurable to provide feedback, warnings, or even implement automatic functionality (e.g., watering and/or fertilizing the lawn) responsive to detection of lawn conditions. The robotic mower 15 may therefore be more capable of being programmed to perform autonomous activities of various kinds and the value proposition for owners and operators may be greatly enhanced.

In some embodiments, the server 620 may include the application manager 40, which may be embodied as or otherwise include processing circuitry 110 as described above in regard to the system 10. As can be appreciated from the descriptions above, the application manager 40 may be employed to provide the user with a robust capability for interacting with the robotic mower 15 for programmatic control or real-time control of the robotic mower 15. In some cases, the programmatic control may include programming the robotic mower 15 to respond to certain situations detected at the robotic mower 15. Thus, certain conditions detected (e.g., via the sensor network 30) may trigger corresponding responses and the conditions and/or responses may be programmed using the application manager 40. In some cases, the sensor network 30 may detect when the robotic mower 15 is removed from the parcel 200. In such cases, a local alarm at the robotic mower 15 may be triggered. Additionally or alternatively, a notification may be sent from the robotic mower 15 to the server 620 and/or the electronic device 42 to alert the user of the removal from the parcel 200 (e.g., via email, MMS or other alerting mechanisms). In other cases, the robotic mower 15 may be programmed to avoid operation during certain detectable weather conditions (or when such conditions are reported via internet connection), or avoid operation when other yard maintenance equipment is operating (e.g., when an irrigation system is operating).

In some embodiments, position and status updates may routinely, continuously, or periodically be provided to the server 620 and/or the electronic device 42. If provided to the server 620, the user may be enabled to monitor such status information when logged in at the electronic device 42. However, the application manager 40 may enable the user to define specific events or triggers that will cause the server 620 to notify the user upon any such occurrences being reported to the server 620. Error or fault conditions may also result in notifications being provided from the robotic mower 15 to the server 620 and/or the electronic device 42. Other conditions, such as service related conditions, may be monitored at the server 620 and the user may be notified when corresponding service conditions warrant attention. Data for troubleshooting or other analytics may also be provided from the robotic mower 15 to the server 620 and/or the electronic device 42. Thus, the application manager 40 may further provide a mechanism by which to troubleshoot various device performance issues.

Figure 8:
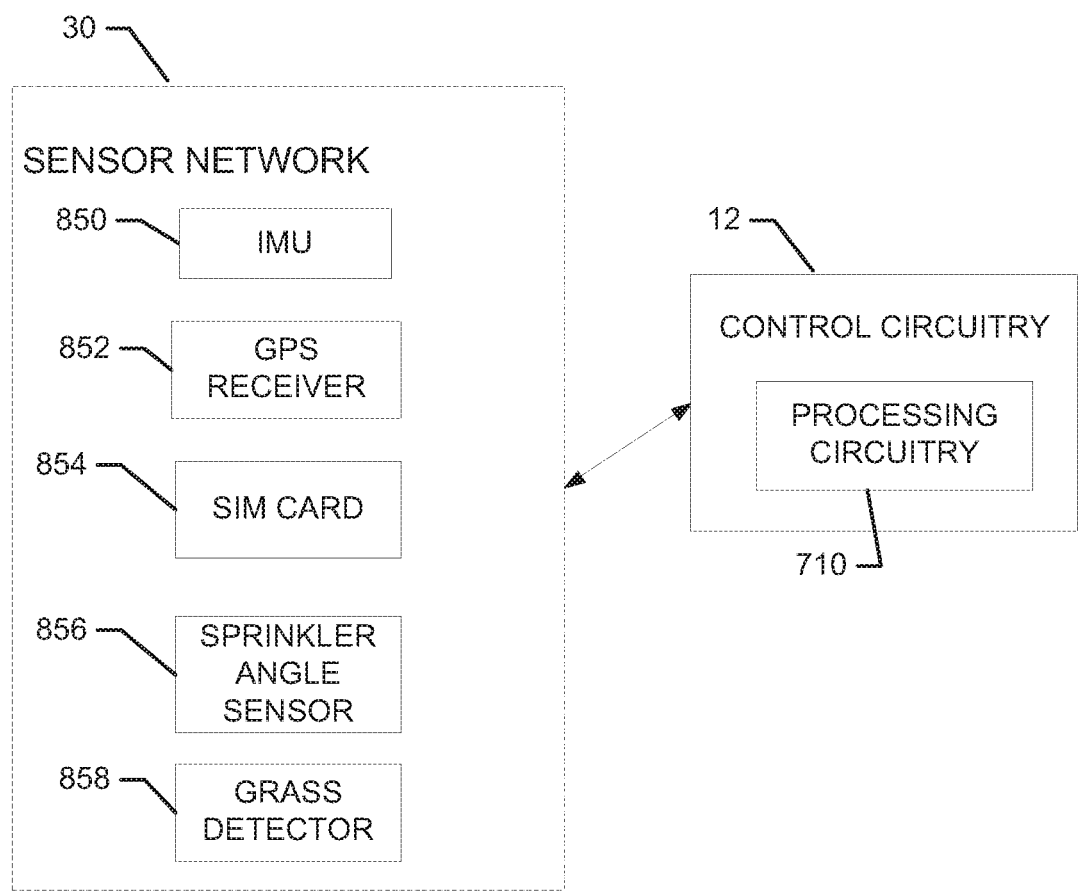
FIG. 8 illustrates a block diagram of some components that may be employed as part of a sensor network in accordance with an example embodiment.

In an example embodiment, the sensor network 30 may provide data to the modules described above to facilitate execution of the functions described above, and/or any other functions that the modules may be configurable to perform. In some cases, the sensor network 30 may include (perhaps among other things) any or all of inertial measurement unit (IMU) 850, a GPS receiver 852, a SIM card 854, a sprinkler angle sensor 856, and a grass detector 858, as shown in FIG. 8. In this regard, FIG. 8 illustrates a block diagram of some components that may be employed as part of the sensor network 30 in accordance with an example embodiment.

The sensor network 30 may include independent devices with on-board processing that communicate with the processing circuitry 710 of the control circuitry 12 via a single data bus, or via individual communication ports. However, in some cases, one or more of the devices of the sensor network 30 may rely on the processing power of the processing circuitry 710 of the control circuitry 12 for the performance of their respective functions. As such, in some cases, one or more of the sensors of the sensor network 30 (or portions thereof) may be embodied as portions of the mapping module 760, the vegetation analyzer 770, and/or the positioning module 780, and any or all of such sensors may employ the camera 95.

The IMU 850 may include one or more and any or all of combinations of accelerometers, odometers, gyroscopes, magnetometers, compasses, and/or the like. As such, the IMU 850 may be configured to determine velocity, direction, orientation and/or the like so that dead reckoning and/or other inertial navigation determinations can be made by the control circuitry 12. The IMU 850 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 15 relative to a known location. For example, navigation conducted via the IMU 850 may be used for robotic mower 15 operation for a period of time, and then a correction may be inserted when a GPS fix is obtained on robotic mower position. As an example alternative, the IMU 850 determined position may be updated every time the robotic mower 15 returns to the charge station 540 (which may be assumed to be at a fixed location). In still other examples, known reference points may be disposed at one or more locations on the parcel 200 and the robotic mower 15 may get a fix relative to any of such known reference points when the opportunity presents itself. The IMU 850 determined position may then be updated with the more accurate fix information.

In some embodiments, the GPS receiver 852 may be embodied as a real time kinematic (RTK)—GPS receiver. As such, the GPS receiver 852 may employ satellite based positioning in conjunction with GPS, GLONASS, Galileo, GNSS, and/or the like to enhance accuracy of the GPS receiver 852. In some cases, carrier-phase enhancement may be employed such that, for example, in addition to the information content of signals received, the phase of the carrier wave may be examined to provide real-time corrections that can enhance accuracy.

The SIM card 854 may be configured to store various types of data including but not limited to position data, map data, and growing condition and lawn wellness data. As such, the SIM card may interact with the positioning module 780, the vegetation analyzer 770, the mapping module 760, any sensors of the sensor network 30, and/or the camera 95. As a mobile storage device, the SIM card may be transferred from the robotic mower 15 to any robotic mowers or electronic devices 42.

The sprinkler angle sensor 856 may be configured to determine which sector of a zone a sprinkler should be distributing water and/or fertilizer. As such, the sprinkler angle sensor 856 may be configured to reduce water and fertilizer consumption. Furthermore, the sprinkler angle sensor 856 may be configured to add more precision to the system 10.

The grass detector 858 may be configured to detect grass using any of a variety of different detection methods related to the particular features that the grass detector 858 is configured to perceive. In this regard, the grass detector 858 may be configured to detect grass based on structural and configured components that able to perceive chlorophyll, specific colors, and/or structures that may be used to indicate grass.

As mentioned above, in some cases, the grass detector 858 may be embodied as a chlorophyll detector. A chlorophyll detector may be a tube that emits light from an LED at specific wavelengths (e.g., red and near-infrared (NIR)) to measure reflected light. Any reflected light may be measured by a photodiode. Chlorophyll pigment absorbs most energy at about 650 nm (red) and around 450 nm (blue). Other pigments absorb more visible wavelengths, but the most absorption occurs in the red and blue portions of the spectrum. This absorption removes these colors from the amount of light that is transmitted and reflected, causing the predominant visible color that reaches eyes as green, causing healthy vegetation to appear dark green. Unhealthy vegetation, on the other hand, has less chlorophyll and thus appears visibly brighter because less light is absorbed and more is reflected. This increase in red reflectance along with the green is what causes a general yellow appearance of unhealthy plants.

Another feature of vegetation is the strong reflectance within the NIR. Since NIR is not absorbed by any pigments within a plant, it travels through most of the leaf and interacts with the spongy mesophyll cells. This interaction causes about half of the energy to be reflected and the other half to be transmitted through the leaf. In plants with healthy mesophyll cell walls and in dense canopies, more NIR energy will be reflected and less transmitted. This cell wall/air space interaction within these cells causes healthy vegetation to look very bright in the NIR. In fact, much more NIR is reflected than visible. By monitoring the amount of NIR and visible energy reflected from the plant, it is possible to determine the health of the plant. As such, plants having a high NIR reflectance and low visible reflectance may be healthy, while plants having a low NIR reflectance and high visible reflectance may be unhealthy.

If the grass detector 858 is instead configured to identify grass based on passively receiving image data and analyzing the image data for colors in the images to distinguish grass from other materials, if possible. In some cases, the camera 95 may be used to capture image data. The image data may include RGB values for various pixels in each image. The RGB values may be transformed into hue, saturation and value (HSV) parameters. A center hue and width may be defined, and saturation and value thresholds could be computed. A determination as to whether a particular area is grass may then be determined based on a comparison of saturation and value parameters to the thresholds. In some cases, the camera 95 may also capture NIR information and both RGB and NIR values can be analyzed for color based grass detection.

Figure 9:
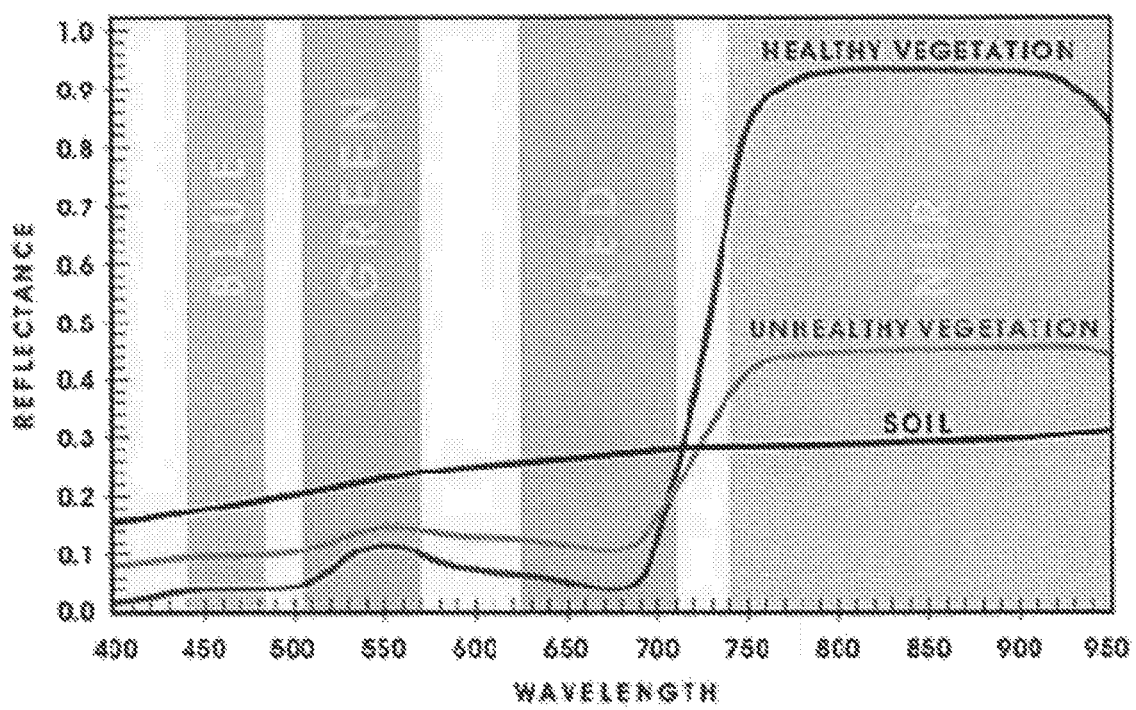
FIG. 9 illustrates a diagram of changes in reflectance for healthy vegetation, unhealthy vegetation, and soil at various wavelengths according to an example embodiment.
Figure 10:
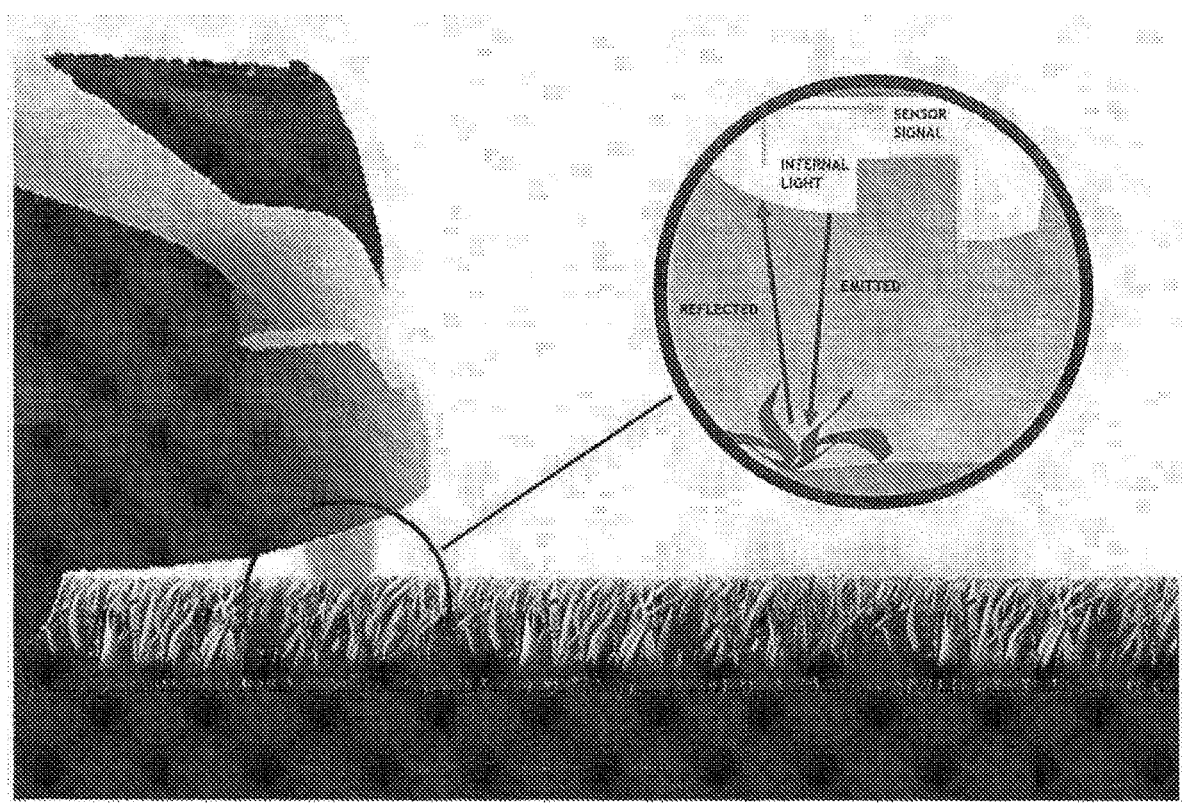
FIG. 10 illustrates a diagram of a sensor function for a robotic mower according to an example embodiment.
Figure 11:
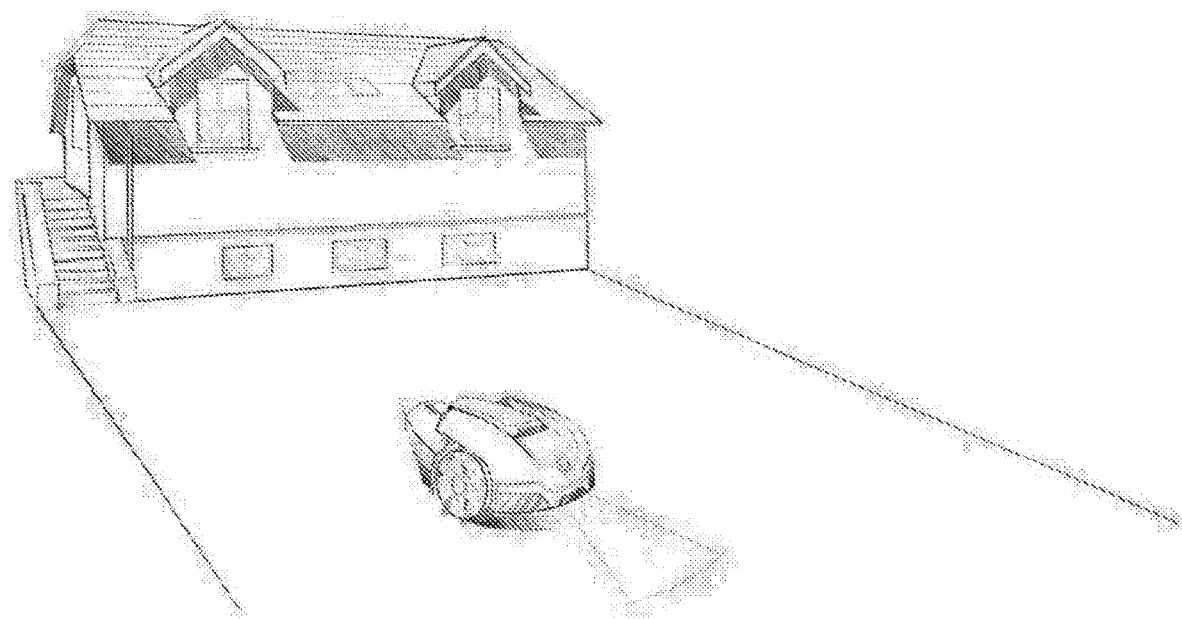
FIG. 11 illustrates a diagram of a sensor function for a robotic mower in an example operating environment.

FIG. 9 illustrates a diagram of changes in reflectance for healthy vegetation, unhealthy vegetation, and soil at various wavelengths according to an example embodiment. For example, FIG. 9 illustrates NIR results from continuous scanning of healthy and unhealthy vegetation with the grass detector 858. Furthermore, FIG. 10 illustrates a diagram of a sensor function for a robotic mower according to an example embodiment. For instance, FIG. 10 illustrates the function of the NIR sensor of the grass detector 858 positioned on the robotic mower 15. Additionally, FIG. 11 illustrates a diagram of a sensor function for a robotic mower in an example operating environment. For instance, FIG. 11 illustrates the continuous scanning of the lawn used by the robotic mower 15 equipped with a grass detector 858 having an NIR sensor.

Embodiments of the present invention may therefore be practiced using an apparatus such as the one depicted in FIGS. 5-11, in connection with the system of FIGS. 1-4. However, it should also be appreciated that some embodiments may be practiced in connection with a computer program product for performing embodiments or aspects of the present invention. As such, for example, each block or step of the flowcharts of FIGS. 12 and 13, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device and executed by processing circuitry.

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 12 and 13. Moreover, other methods derived from the descriptions provided herein may also be performed responsive to execution of steps associated with such methods by a computer programmed to be transformed into a machine specifically configured to perform such methods.

In an example embodiment, a method for collecting and analyzing lawn wellness and growing conditions according to FIG. 12 may include receiving position data from a positioning module in operation 901; receiving sensor data from a sensor network including one or more sensors disposed on a parcel of land in operation 902; determining current lawn conditions on the parcel based on the sensor data using a vegetation analyzer module in operation 903; comparing the current lawn conditions to desirable lawn conditions associated with vegetation planted on the parcel of land in operation 904; providing at least one instruction relative to operation of task performance equipment configured to perform a task on the parcel, the task being associated with generating a result that is enabled to be monitored via the sensor equipment in operation 905; and employing a robotic vehicle to work the parcel in operation 906.

FIG. 13 illustrates a control flow diagram of one example of how the robotic mower 10 can be operated in relation to using the sensors thereon in accordance with an example embodiment. As shown in FIG. 13, operation may begin with receiving position data from a positioning module in operation 951 and receiving sensor data from a sensor network including one or more sensors disposed on a parcel of land in operation 952. The operation may continue by determining current lawn conditions on the parcel based on the sensor data using a vegetation analyzer module in operation 953. The operation may further continue by deciding whether the lawn is healthy by comparing current lawn conditions to desirable lawn conditions associated with vegetation planted on the parcel of land in operation 954. If the lawn is healthy, then the operation continues by maintaining the current maintenance and monitoring schedule in operation 955*a*. However, if the lawn is not healthy, then the operation continues by remedying plant stress and/or any infestations with the appropriate means (e.g., watering, fertilizing, etc.) in operation 955*b*.

As such, in some cases, the robotic mower 15 may generally operate in accordance with a control method that combines the modules described above to provide a functionally robust robotic vehicle. In this regard, a method according to example embodiments of the invention may include any or all of the operations shown in FIG. 13. Moreover, other methods derived from the descriptions provided herein may also be performed responsive to execution of steps associated with such methods by a computer programmed to be transformed into a machine specifically configured to perform such methods.

According to an example embodiment and as discussed above, the system 10 may involve a mobile application managed by the application manager 40. For example, FIG. 14 illustrates a diagram of a mobile application for a robotic mower according to an example embodiment. The mobile application illustrated in FIG. 14 may be accessed by a user on any of a mobile phone, tablet, computer, or any other "smart" electronic device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic vehicle comprising:
one or more functional components configured to execute one or more lawn care functions on a parcel in accordance with a schedule, the one or more lawn care functions comprising grass mowing and the one or more functional components of the robotic vehicle comprising a blade control system comprising a cutting blade for grass mowing;

one or more sensors configured to detect conditions proximate to the robotic vehicle;
a vegetation analyzer module configured to analyze data received from the one or more sensors to determine lawn wellness information;
a positioning module configured to determine a robotic vehicle position; and
a mapping module configured to correlate the lawn wellness information with the robotic vehicle position,
wherein the lawn wellness information comprises one or more of water stress, nutrient stress, weed infestation, and pest infestation,
wherein, via the vegetation analyzer module, the robotic vehicle is configured to adjust the schedule based on the lawn wellness information;
wherein the robotic vehicle is further configured to move to a plurality of fixed sensors within the parcel, read data from each of the plurality of fixed sensors, and store the data read from each of the plurality of fixed sensors on a memory device of the robotic vehicle;
wherein the vegetation analyzer is further configured to determine the lawn wellness information based on the data received from the one or more sensors indicating conditions detected proximate the robotic vehicle and the data read from each of the plurality of fixed sensors by the robotic vehicle.

2. The robotic vehicle of claim 1, wherein the one or more sensors comprises at least one of an inertial measurement unit (IMU), a real time kinematic (RTK)-GPS receiver, a SIM card, a sprinkler angle sensor, or a grass detector.

3. The robotic vehicle of claim 2, wherein the vegetation analyzer module is configured to receive the lawn wellness information from a grass detector.

4. The robotic vehicle of claim 3, wherein the grass detector comprises a near-infrared (NIR) sensor.

5. The robotic vehicle of claim 4, wherein the NIR sensor provides plant NIR reflectance information and plant visible reflectance information to the vegetation analyzer module.

6. The robotic vehicle of claim 5, wherein high NIR reflectance and low visible reflectance indicates a healthy plant.

7. The robotic vehicle of claim 5, wherein low NIR reflectance and high visible reflectance indicates an unhealthy plant.

8. The robotic vehicle of claim 1, wherein the one or more sensors further comprises a camera.

9. The robotic vehicle of claim 8, wherein the camera provides images of grass to the vegetation analyzer module for determining the lawn wellness information.

10. The robotic vehicle of claim 1, wherein the mapping module is configured to operate in a map generation mode.

11. The robotic vehicle of claim 10, wherein the mapping module is configured to incorporate input from the one or more sensors to determine a current position of the robotic vehicle and the lawn wellness information at the current position of the robotic vehicle to generate a map of the parcel responsive to traversal of the parcel by the robotic vehicle.

12. The robotic vehicle of claim 11, wherein the mapping module is configured to divide the map into a plurality of zones in which each of the plurality of zones is defined by a corresponding geographic description and corresponding predefined lawn conditions relative to the map data.

13. The robotic vehicle of claim 12, wherein the predefined lawn conditions comprises plant data corresponding to at least one plant growing within a respective one of the plurality of zones, and wherein the plant data defines predefined growth parameters of the at least plant.

14. A system comprising:
a plurality of fixed sensors disposed on a parcel of land configured to detect conditions on the parcel of land; and
a robotic vehicle configured to perform a task in accordance with a schedule on the parcel, the robotic vehicle comprising one or more functional components configured to execute a lawn care functions associated with the task, the lawn care functions comprising grass mowing and the one or more functional components comprising a blade control system comprising a cutting blade for grass mowing;
wherein the robotic vehicle is configured to:
move to the plurality of fixed sensors within the parcel, read data from each of the plurality of fixed sensors, store the data read from each of the plurality of fixed sensors on a memory device of the robotic vehicle, and
execute an adjustment to the schedule based on lawn wellness information, the lawn wellness information being determined based on the data read from each of the plurality of fixed sensors by the robotic vehicle.

15. The robotic vehicle of claim 14, wherein the robotic vehicle is configured to transfer power, via inductive power transmission, from a power source of the robotic vehicle to at least one of the plurality of fixed sensors to power or recharge a battery of the at least one of the plurality of fixed sensors.

16. The robotic vehicle of claim 14, wherein the robotic vehicle is configured to transfer power from a power source of the robotic vehicle to a sprinkler to operate a valve of the sprinkler via a wired or wireless connection between the robotic vehicle and the sprinkler.

17. The robotic vehicle of claim 14, wherein the robotic vehicle further comprises an RFID reader and the robotic vehicle is configured to read an RFID tag of at least one of the plurality of fixed sensors within the parcel and capture a position of the robotic vehicle when the RFID tag is read to determine a location of the at least one of the plurality of fixed sensors.

18. The robotic vehicle of claim 14, robotic vehicle is configured to use low power short range communications to read the data from each of the plurality of fixed sensors.

19. The robotic vehicle of claim 18, wherein the robotic vehicle uses high power communications to transmit the transmit the data read from each of the plurality of fixed sensors to an application manager.

20. The robotic vehicle of claim 14, wherein the robotic vehicle is further configured to:
move to and dock with a battery charging station; and
transmit the data read from each of the plurality of fixed sensors to an application manager in response docking with the battery charging station.

21. The robotic vehicle of claim 14, wherein the robotic vehicle is configured to use low power short range communications to transmit the data read from each of the plurality of fixed sensors to the battery charging station.

* * * * *